(12) United States Patent
Yu

(10) Patent No.: US 12,223,827 B2
(45) Date of Patent: *Feb. 11, 2025

(54) AUTOMATED PROGRAMMING OF A REMOTE CONTROL

(71) Applicant: B&W Group Ltd., Worthing (GB)

(72) Inventor: Gaylord Yu, San Francisco, CA (US)

(73) Assignee: B&W Group Ltd., Worthing (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,343

(22) Filed: Jun. 2, 2023

(65) Prior Publication Data

US 2024/0135802 A1 Apr. 25, 2024
US 2024/0233517 A9 Jul. 11, 2024

Related U.S. Application Data

(63) Continuation of application No. 17/587,039, filed on Jan. 28, 2022, now Pat. No. 11,699,341, which is a
(Continued)

(51) Int. Cl.
*H04N 21/41* (2011.01)
*G06F 16/732* (2019.01)
(Continued)

(52) U.S. Cl.
CPC ......... *G08C 17/00* (2013.01); *G06F 16/7328* (2019.01); *H04N 21/41265* (2020.08); *H04N 21/42204* (2013.01); *H04N 21/4223* (2013.01); *H04N 21/43615* (2013.01); *H04N 21/4363* (2013.01); *H04N 21/4394* (2013.01); *H04N 21/44008* (2013.01); *H04N 21/472* (2013.01);
(Continued)

(58) Field of Classification Search
CPC ............ G08C 17/00; H04N 21/42204; H04N 21/4223; H04N 21/43615
See application file for complete search history.

(56) References Cited

U.S. PATENT DOCUMENTS 4,703,359 A * 10/1987 Rumbolt ............... H04B 1/202
 398/112
6,225,938 B1 * 5/2001 Hayes ................... H04N 5/775
 235/462.46
(Continued)

*Primary Examiner* — Joshua D Taylor
(74) *Attorney, Agent, or Firm* — Nieves IP Law Group, LLC; Peter A. Nieves

(57) ABSTRACT

An electronic device that obtains a set of remote-control commands is described. During operation, the electronic device may receive an image associated with a second electronic device, where a brand and a model of the second electronic device are initially unknown to the electronic device. Then, the electronic device may perform image analysis on the image to determine at least the brand of the second electronic device. Moreover, the electronic device may access, based at least in part on the determined brand, the set of remote-control commands that are associated with the second electronic device. Next, the electronic device may store the set of remote-control commands in memory. Subsequently, when the electronic device receives user-interface activity information associated with a portable electronic device that specifies selection of the second electronic device, the electronic device may provide the set of remote-control commands to the second electronic device.

21 Claims, 11 Drawing Sheets

Related U.S. Application Data continuation of application No. 16/398,170, filed on Apr. 29, 2019, now Pat. No. 11,257,357, which is a continuation-in-part of application No. 15/607,614, filed on May 29, 2017, now abandoned.

(51) Int. Cl.
| | |
|---|---|
| *G08C 17/00* | (2006.01) |
| *H04N 21/422* | (2011.01) |
| *H04N 21/4223* | (2011.01) |
| *H04N 21/436* | (2011.01) |
| *H04N 21/4363* | (2011.01) |
| *H04N 21/439* | (2011.01) |
| *H04N 21/44* | (2011.01) |
| *H04N 21/472* | (2011.01) |
| *H04N 21/482* | (2011.01) |
| *G06V 30/10* | (2022.01) |

(52) U.S. Cl.
CPC ........... *H04N 21/482* (2013.01); *G06V 30/10* (2022.01); *G08C 2201/20* (2013.01); *H04N 21/4126* (2013.01)

(56) References Cited

U.S. PATENT DOCUMENTS

| 10,201,939 B1* | 2/2019 | Pare | G05B 15/02 |
|---|---|---|---|
| 2004/0095316 A1* | 5/2004 | Shibamiya | G08C 17/02 |
| | | | 348/E5.103 |

\* cited by examiner

AUTOMATED PROGRAMMING OF A REMOTE CONTROL

CROSS-REFERENCE TO RELATED APPLICATION(S)

This application claims priority under 35 U.S.C. 120 as a continuation of U.S. patent application Ser. No. 17/587,039, "Automated Programming of a Remote Control" filed on Jan. 28, 2022, which is a continuation of application Ser. No. 16/398,170, "Automated Programming of a Remote Control" filed on Apr. 29, 2019, which is a Continuation-in-Part of U.S. patent application Ser. No. 15/607,614, "Automated Identification of Viewed Content," filed on May 29, 2017, the contents of each of which are hereby incorporated by reference in their entireties.

BACKGROUND

Field

The described embodiments relate to content-analysis techniques, including identifying and obtaining a set of remote-control commands for an electronic device based on analysis of an associated image.

Related Art

The versatility and capabilities of consumer-electronic devices (and, more generally, electronic devices) is increasing their popularity. Consequently, the are a large number of consumer-electronic devices on the market. These consumer-electronics devices have a wide range of capabilities and functionality.

Moreover, the consumer-electronic devices often have their own proprietary commands that are used during operation, such as remote-control commands. Therefore, in order to facilitate use of a particular consumer-electronic devices, the appropriate set of remote-control commands usually needs to be used.

However, it can be difficult to identify the appropriate set of remote-control commands because many consumer-electronic devices do not provide or communicate identification information. For example, many consumer-electronic devices do not support features such as audio return channel (ARC) in a high-definition multimedia interface (HDMI), which would allow a consumer-electronic device to provide identification information. In the absence of such identification information, it can be difficult to determine the appropriate set of remote-control commands, which may complicate or pose an obstacle to the use of some consumer-electronic devices, and which can frustrate users and degrade the user experience.

SUMMARY

The described embodiments include an electronic device (such as an audio/video or A/V hub, an A/V display device or a computer). This electronic device includes: an interface circuit that communicates with a second electronic device, and a portable electronic device. During operation, the electronic device receives, via the interface circuit, an image associated with the second electronic device, where a brand and a model of the second electronic device are initially unknown to the electronic device. Then, the electronic device performs image analysis on the image to determine at least the brand of the second electronic device. Moreover, the electronic device accesses, based at least in part on the determined brand, a set of remote-control commands that are associated with the second electronic device, and stores the set of remote-control commands in memory in or associated with the electronic device. Subsequently, when the electronic device receives, via the interface circuit, user-interface activity information associated with the portable electronic device that specifies selection of the second electronic device in a user interface, the electronic device provides, via the interface circuit, the set of remote-control commands intended for the second electronic device.

Note that receiving the image may involve wired or wireless communication, while providing the set of remote-control commands may involve wireless communication.

Moreover, the set of remote-control commands may include commands associated with infrared communication.

Furthermore, performing the image analysis may involve the electronic device providing, via the interface circuit, the image intended for a computer (e.g., at a remote location), and subsequently receiving, via the interface circuit, second information associated with the computer that specifies at least the brand of the second electronic device.

Additionally, the image analysis may determine the model of the second electronic device, and accessing the set of remote-control commands may be based at least in part on the determined model.

In some embodiments, accessing the set of remote-control commands involves receiving, via the interface circuit, the set of remote-control commands, e.g., from the computer at a remote location.

Moreover, when the model of the second electronic device remains unknown after the image analysis, accessing the set of remote-control commands may involve accessing multiple sets of remote-control commands that are potentially associated with the second electronic device and that include the set of remote-control commands. For example, the multiple sets of remote-control commands may be associated with the determined brand. Alternatively or additionally, the multiple sets of remote-control commands may be associated with a type of the second electronic device. Then, the electronic device may provide, via the interface circuit, at least a remote-control command in a given set of remote-control commands that is associated with a given model and that is intended for the portable electronic device, along with an instruction for the portable electronic device to output at least the remote-control command to the second electronic device. Alternatively, instead of the electronic device providing at least the remote-control command intended for the portable electronic device, the electronic device may provide, via the interface circuit, a command corresponding to at least the remote-control command in a given set of remote-control commands intended for the second electronic device.

Next, the electronic device may monitor whether the second electronic device responds to at least the remote-control command or the command. For example, the electronic device may monitor an interface connected or coupled to the second electronic device to detect a change in activity and, more generally, may determine a change in state of the second electronic device. The providing and monitoring operations may be repeated with different remote-control commands or different commands corresponding to different remote-control commands in the multiple sets of remote-control commands that are intended for the second electronic device until a response of the second electronic device is detected (such as information that indicates the change in the state, receiving of audio or video content, or, more generally, a data stream associated with the second electronic device, etc.). Based at least in part on the detected response, the electronic device may identify the model of the second electronic device. Note that the identification of the model may be automatically performed by the electronic device without further human action.

Furthermore, the image may include a logo or a graphical icon associated with the second electronic device.

Additionally, the image may be included in a set of predefined images associated with different brands and different models of electronic devices.

In some embodiments, the portable electronic device includes a remote control.

Moreover, the electronic device may include a control circuit. In some embodiments, the control circuit may include: a processor; and a memory, coupled to the processor, which stores program instructions. During operation, the program instructions may be executed by the processor, which cause the processor to perform at least some of the operations performed by the control circuit and/or the electronic device.

Another embodiment provides a computer-readable storage medium for use with the electronic device. This computer-readable storage medium may include program instructions that, when executed by the electronic device, cause the electronic device to perform at least some of the aforementioned operations.

Another embodiment provides a method for determining a set of remote-control commands. This method includes at least some of the operations performed by the electronic device.

Another embodiment provides the A/V display device, the portable electronic device and/or the computer.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
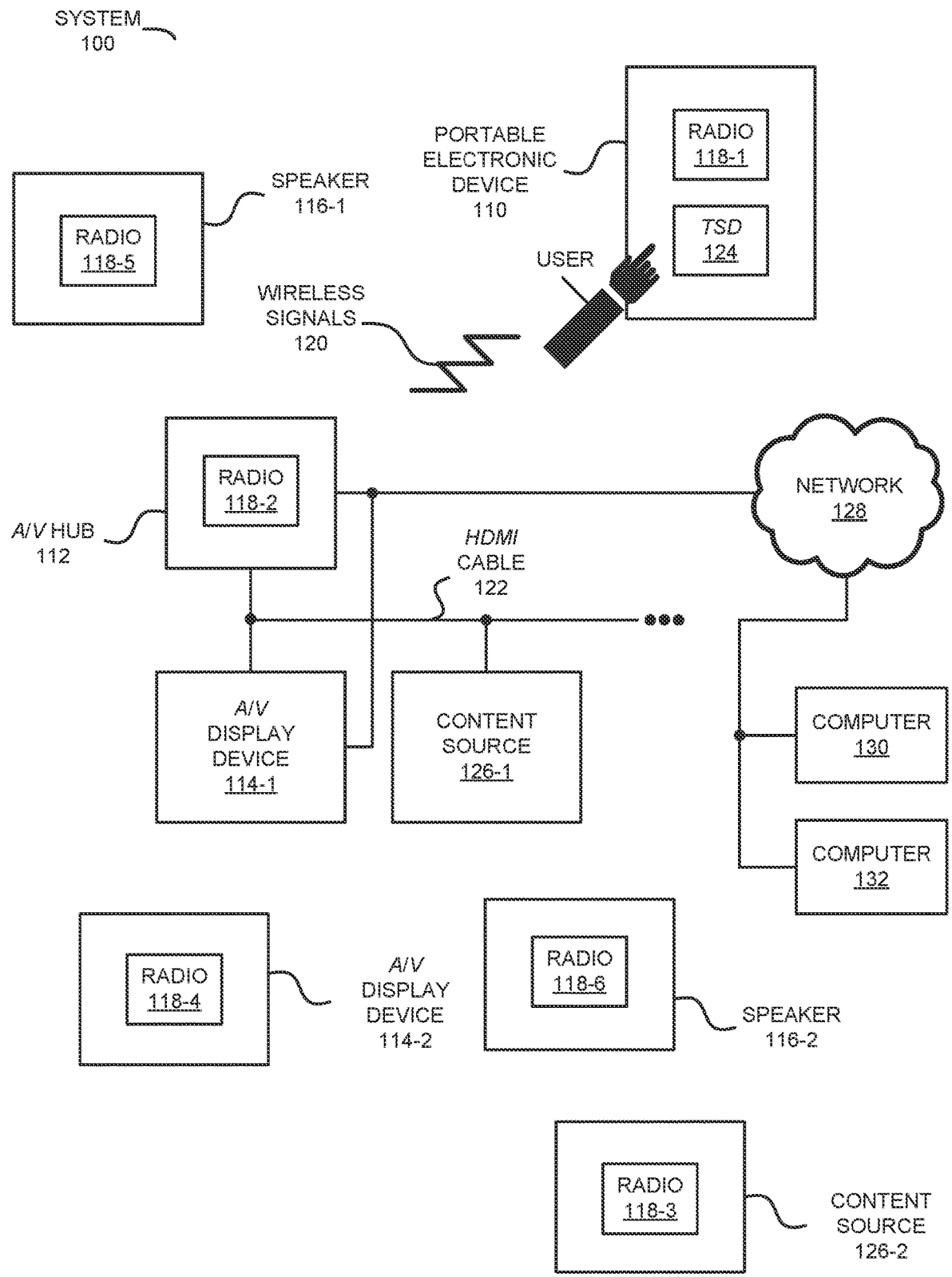
FIG. 1 is a block diagram illustrating a system with electronic devices wirelessly communicating in accordance with an embodiment of the present disclosure.

An electronic device that obtains a set of remote-control commands is described. During operation, the electronic device may receive an image associated with a second electronic device (such as a consumer-electronic device, an entertainment device or a computer), where a brand and a model of the second electronic device are initially unknown to the electronic device. Then, the electronic device may perform image analysis on the image to determine at least the brand of the second electronic device. Moreover, the electronic device may access, based at least in part on the determined brand, the set of remote-control commands that are associated with the second electronic device. Next, the electronic device may store the set of remote-control commands in memory. Subsequently, when the electronic device receives user-interface activity information associated with a portable electronic device (such as a remote control) that specifies selection of the second electronic device, the electronic device may provide the set of remote-control commands to the second electronic device.

By identifying and obtaining the set of remote-control commands, this content-analysis technique may facilitate use of electronic devices (such as the second electronic device) that do not have the ability to directly provide information that specifies their brand or model to the electronic device. Consequently, the content-analysis technique may automatically facilitate interoperability of electronic devices with different capabilities and functionality. Therefore, the content-analysis technique may eliminate the need for a user of the second electronic device to manually provide or program the set of remote-control commands, or to use the portable electronic device to attempt to identify the set of remote-control commands by iteratively having the portable electronic device provide different remote-control commands until a response of the second electronic device is received or detected. Thus, the content-analysis technique may reduce user frustration and may improve the user experience when using the electronic device, the portable electronic device and/or the second electronic device.

In the discussion that follows the A/V hub or the A/V display device (either of which are sometimes referred to an 'electronic device'), the portable electronic device, one or more content sources (which may be associated with one or more content providers), and/or another electronic device (such as a speaker and, more generally, a consumer-electronic device) may include radios that communicate packets or frames in accordance with one or more communication protocols, such as: an Institute of Electrical and Electronics Engineers (IEEE) 802.11 standard (which is sometimes referred to as 'Wi-Fi®,' from the Wi-Fi® Alliance of Austin, Texas), Bluetooth® (from the Bluetooth Special Interest Group of Kirkland, Washington), a cellular-telephone communication protocol, a near-field-communication standard or specification (from the NFC Forum of Wakefield, Massachusetts), and/or another type of wireless interface. In the discussion that follows, Wi-Fi is used as an illustrative example. For example, the cellular-telephone communication protocol may include or may be compatible with: a $2^{nd}$ generation of mobile telecommunication technology, a $3^{rd}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique. In some embodiments, the communication protocol includes Long Term Evolution or LTE. However, a wide variety of communication protocols may be used (such as Ethernet or a power-line communication protocol). In addition, the communication may occur via a wide variety of frequency bands. Note that the portable electronic device, the A/V hub, the A/V display device, the one or more content sources, one or more speakers and/or another electronic device may communicate using infrared communication that is compatible with an infrared communication standard (including unidirectional or bidirectional infrared communication).

Moreover, A/V content in following discussion may include video and associated audio (such as music, sound, dialog, etc.), video only or audio only.

Communication among electronic devices is shown in FIG. 1, which presents a block diagram illustrating a system 100 with a portable electronic device 110 (such as a remote control or a cellular telephone), an A/V hub 112, one or more A/V display devices 114 (such as a television, a monitor, a computer and, more generally, a display associated with an electronic device), one or more speakers 116, and one or more content sources 126 associated with one or more content providers (e.g., a radio receiver, a video player, a satellite receiver, an access point that provides a connection to a network 128 such as the Internet, a media or a content source, a consumer-electronic device, an entertainment device, a set-top box, a cable-television box, an over-the-top content delivered over the Internet or network 128 without involvement of a cable, satellite or multiple-system operator, a security camera, a monitoring camera, etc.). (Note that A/V hub 112, the one or more A/V display devices 114, and the one or more content sources 126 are sometimes collectively referred to as 'components' in system 100. However, A/V hub 112, the one or more A/V display devices 114, and the one or more content sources 126 are sometimes referred to as 'electronic devices.') In particular, portable electronic device 110 and A/V hub 112 may communicate with each other using wireless communication, and A/V hub 112 and other components in system 100 (such as the one or more A/V display devices 114, the one or more speakers 116 and the one or more content sources 126) may communicate using wireless and/or wired communication. During the wireless communication, these electronic devices may wirelessly communicate while: transmitting advertising frames on wireless channels, detecting one another by scanning wireless channels, establishing connections (for example, by transmitting association requests), and/or transmitting and receiving packets or frames (which may include the association requests and/or additional information as payloads, such as user-interface information, device-state information, user-interface activity information, data, A/V content, information specifying communication performance, information specifying a user interface, etc.).

Figure 11:
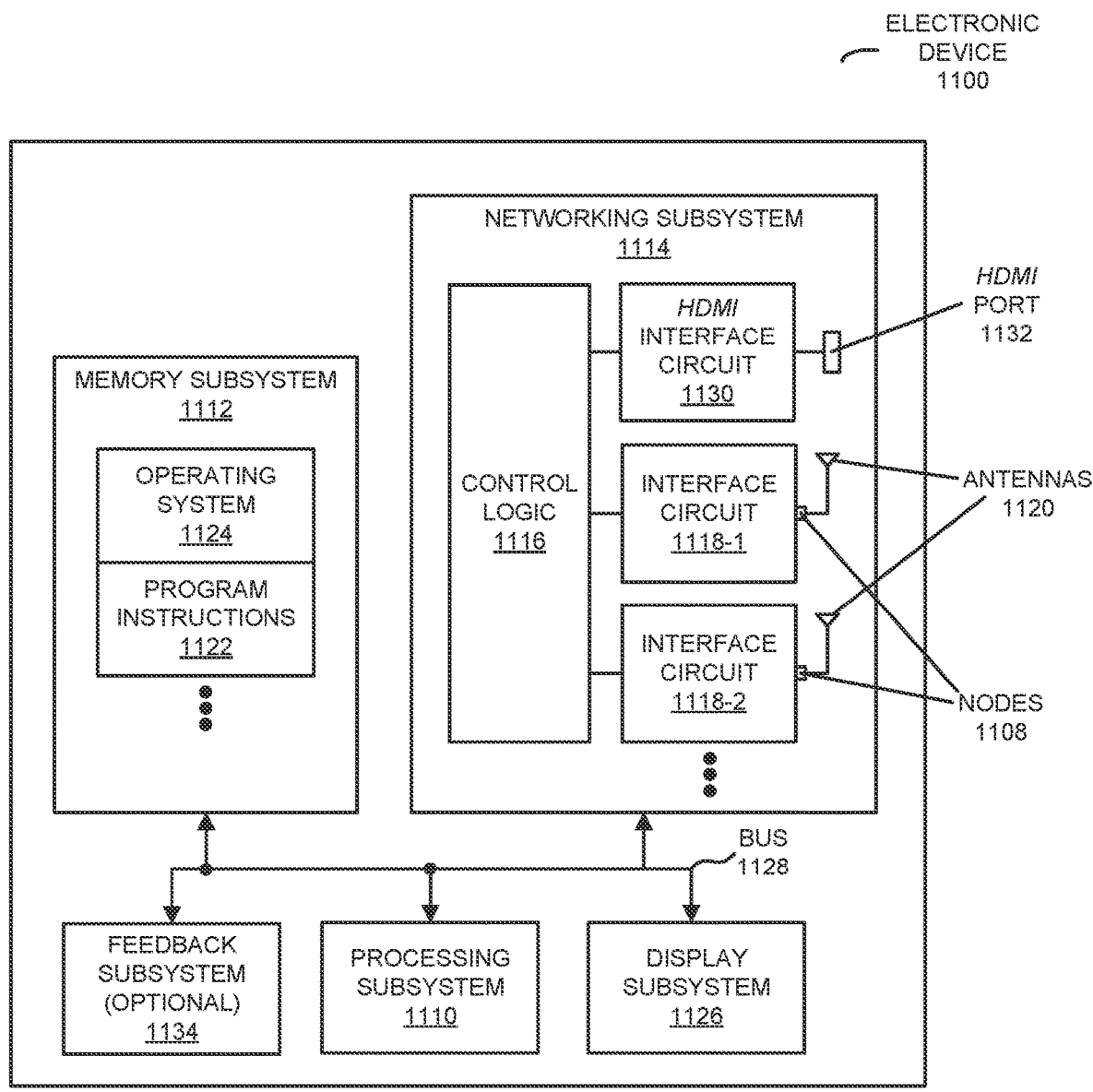
FIG. 11 is a block diagram illustrating one of the electronic devices of FIG. 1 in accordance with an embodiment of the present disclosure.

As described further below with reference to FIG. 11, portable electronic device 110, A/V hub 112, the one or more A/V display devices 114, the one or more speakers 116 and the one or more content sources 126 may include subsystems, such as: a networking subsystem, a memory subsystem and a processor subsystem. In addition, portable electronic device 110 and A/V hub 112, and optionally one or more of the one or more A/V display devices 114, the one or more speakers 116 and/or the one or more content sources 126, may include radios 118 in the networking subsystems. (Note that radios 118 may be instances of the same radio or may be different from each other.) More generally, portable electronic device 110 and A/V hub 112 (and optionally one or more of the one or more A/V display devices 114, the one or more speakers 116 and/or the one or more content sources 126) can include (or can be included within) any electronic devices with the networking subsystems that enable portable electronic device 110 and A/V hub 112 (and optionally one or more of A/V display devices 114, the one or more speakers 116 and/or the one or more content sources 126) to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc.

As can be seen in FIG. 1, wireless signals 120 (represented by a jagged line) are transmitted from radio 118-1 in portable electronic device 110. These wireless signals may be received by at least A/V hub 112. In particular, portable electronic device 110 may transmit packets. In turn, these packets may be received by a radio 118-2 in A/V hub 112. This may allow portable electronic device 110 to communicate information to A/V hub 112. While FIG. 1 illustrates portable electronic device 110 transmitting packets, note that portable electronic device 110 may also receive packets from A/V hub 112 and/or one or more other components in system 100. More generally, wireless signals may be transmitted and/or received by one or more of the components in system 100.

In the described embodiments, processing of a packet or frame in portable electronic device 110 and A/V hub 112 (and optionally one or more of the one or more A/V display devices 114, the one or more speakers 116 and/or the one or more content sources 126) includes: receiving wireless signals 120 with the packet or frame; decoding/extracting the packet or frame from received wireless signals 120 to acquire the packet or frame; and processing the packet or frame to determine information contained in the packet or frame (such as the information associated with a data stream). For example, the information from portable electronic device 110 may include user-interface activity information associated with a user interface displayed on touch-sensitive display (TSD) 124 in portable electronic device 110, which a user of portable electronic device 110 uses to control A/V hub 112, the one or more A/V display devices 114, the one or more speakers 116 and/or one of the one or more content sources 126. (In some embodiments, instead of or in additional to touch-sensitive display 124, portable electronic device 110 includes a user interface with physical knobs and/or buttons that a user can use to control A/V hub 112, the one or more A/V display devices 114, the one or more speakers 116 and/or one of the one or more content sources 126.) Alternatively, the information from A/V hub 112 may include device-state information about a current device state of one or more of A/V display devices 114, one or more of speakers 116 or one of the one or more content sources 126 (such as on, off, play, rewind, fast forward, a selected channel, selected content, a content source, etc.), or may include user-interface information for the user interface (which may be dynamically updated based on the device-state information and/or the user-interface activity information). Furthermore, the information from A/V hub 112 and/or one of the one or more content sources 126 may include audio and video (which is sometimes denoted as 'audio/video' or 'A/V') that are displayed or presented on one or more of A/V display devices 114 and/or one or more of speakers 116, as well as display instructions that specify how the audio and video are to be displayed.

However, as noted previously, the audio and video may be communicated between components in system 100 via wired communication. Therefore, as shown in FIG. 1, there may be a wired cable or link, such as an HDMI cable 122, between A/V hub 112 and A/V display device 114-1. While the audio and/or video may be included in or associated with HDMI content, in other embodiments the audio content may be included in or associated with A/V content that is compatible with another format or standard is used in the embodiments of the disclosed communication technique. For example, the A/V content may include or may be compatible with: H.264, MPEG-2, a QuickTime video format, MPEG-4, MP4, and/or TCP/IP. Moreover, the video mode of the A/V content may be 720p, 1080i, 1080p, 1440p, 2000, 2160p, 2540p, 4000p and/or 4320p.

Note that A/V hub 112 may determine display instructions (with a display layout) for the A/V content based on a format of a display in one of A/V display devices 114, such as A/V display device 114-1. Alternatively, A/V hub 112 can use pre-determined display instructions or A/V hub 112 can modify or transform the A/V content based on the display layout so that the modified or transformed A/V content has an appropriate format for display on the display. Moreover, the display instructions may specify information to be displayed on the display in A/V display device 114-1, including where A/V content is displayed (such as in a central window, in a tiled window, etc.). Consequently, the information to be displayed (i.e., an instance of the display instructions) may be based on a format of the display, such as: a display size, display resolution, display aspect ratio, display contrast ratio, a display type, etc. Furthermore, note that when A/V hub 112 receives the A/V content from one of content sources 126, A/V hub 112 may provide the A/V content and display instructions to A/V display device 114-1 as frames with the A/V content are received from one of content sources 126 (e.g., in real time), so that the A/V content is displayed on the display in A/V display device 114-1. For example, A/V hub 112 may collect the A/V content in a buffer until a frame is received, and then A/V hub 112 may provide the complete frame to A/V display device 114-1. Alternatively, A/V hub 112 may provide packets with portions of a frame to A/V display device 114-1 as they are received. In some embodiments, the display instructions may be provided to A/V display device 114-1 differentially (such as when the display instructions change), regularly or periodically (such as in one of every N packets or in a packet in each frame) or in each packet.

Moreover, note that the communication between portable electronic device 110 and A/V hub 112 (and optionally one or more of the one or more A/V display devices 114, the one or more speakers 116 and/or the one or more content sources 126) may be characterized by a variety of performance metrics, such as: a data rate, a data rate discounting radio protocol overhead (which is sometimes referred to as a 'throughput'), an error rate (such as a packet error rate, or a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a channel or link), and/or a ratio of an actual data rate to an estimated data rate (which is sometimes referred to as 'utilization'). Moreover, the performance during the communication associated with different channels may be monitored individually or jointly (e.g., to identify dropped packets).

The communication between portable electronic device 110 and A/V hub 112 (and optionally one or more of the one or more A/V display devices 114, the one or more speakers 116 and/or the one or more content sources 126) in FIG. 1 may involve one or more independent, concurrent data streams in different wireless channels (or even different communication protocols, such as different Wi-Fi communication protocols) in one or more connections or links, which may be communicated using multiple radios. Note that the one or more connections or links may each have a separate or different identifier (such as a different service set identifier) on a wireless network in system 100 (which may be a proprietary network or a public network). Moreover, the one or more concurrent data streams may, on a dynamic or packet-by-packet basis, be partially or completely redundant to improve or maintain the performance metrics even when there are transient changes (such as interference, changes in the amount of information that needs to be communicated, movement of portable electronic device 110, etc.), and to facilitate services (while remaining compatible with the communication protocol, e.g., a Wi-Fi communication protocol) such as: channel calibration, determining of one or more performance metrics, performing quality-of-service characterization without disrupting the communication (such as performing channel estimation, determining link quality, performing channel calibration and/or performing spectral analysis associated with at least one channel), seamless handoff between different wireless channels, coordinated communication between components, etc. These features may reduce the number of packets that are resent, and, thus, may decrease the latency and avoid disruption of the communication and may enhance the experience of one or more users that are viewing A/V content on the one or more A/V display devices 114 and/or listening to audio output by one or more of speakers 116.

As noted previously, a user may control A/V hub 112, one or more of the one or more A/V display devices 114, one or more of the one or more speakers 116 and/or one of the one or more content sources 126 via the user interface displayed on touch-sensitive display 124 on portable electronic device. In particular, at a given time, the user interface may include one or more virtual icons that allow the user to activate, deactivate or change functionality or capabilities of A/V hub 112, one or more of A/V display devices 114, one or more speakers 116 and/or one or more of content sources 126. For example, a given virtual icon in the user interface may have an associated strike area on a surface of touch-sensitive display 124. If the user makes and then breaks contact with the surface (e.g., using one or more fingers or digits, or using a stylus) within the strike area, portable electronic device 110 (such as a processor executing a program module or program instructions) may receive user-interface activity information indicating activation of this command or instruction from a touch-screen input/output (I/O) controller, which is coupled to touch-sensitive display 124. (Alternatively, touch-sensitive display 124 may be responsive to pressure. In these embodiments, the user may maintain contact with touch-sensitive display 124 with an average contact pressure that is usually less than a threshold value, such as 10-20 kPa, and may activate a given virtual icon by increase the average contact pressure with touch-sensitive display 124 above the threshold value.) In response, the program instructions may instruct an interface circuit in portable electronic device 110 to wirelessly communicate the user-interface activity information indicating the command or instruction to A/V hub 112, and A/V hub 112 may communicate the command or the instruction to the target component in system 100 (such as A/V display device 114-1). This instruction or command may result in A/V display device 114-1 turning on or off, displaying A/V content from a particular content source, performing a trick mode of operation (such as fast forward, reverse, fast reverse or skip), etc. For example, A/V hub 112 may request the A/V content from content source 126-1, and then may provide the A/V content to along with display instructions to A/V display device 114-1, so that A/V display device 114-1 displays the A/V content. Alternatively or additionally, A/V hub 112 may provide audio content associated with video content from content source 126-1 to one or more of speakers 116.

One problem with using existing remote controls to control the operation of another component or electronic device is that the remote control does not receive any feedback from the electronic device. For example, many existing remote controls use infrared communication. However, typically existing infrared communication protocols are unidirectional or one-way communication, i.e., from a remote control to the electronic device. Consequently, the remote control usually does not have any knowledge of the effects of the commands or instructions that are communicated to the electronic device. In particular, the remote control is typically unaware of a current state of the electronic device, such as whether the electronic device is in: a power-on state, a power-off state, a playback state, a trick-mode state (such as fast forward, fast reverse, or skip), a pause state, a standby (reduced-power) state, a record state, a state in which A/V content associated with a given content source (such as cable television, a satellite network, a web page on the Internet, etc.) is received or provided, and/or another state. (Note that one or more of the states may be nested or concurrent with each other, such as the power-on state and the playback state.) By operating blindly in this way, existing remote control are unable to leverage knowledge of the current state of the electronic device to improve the user experience.

This problem is addressed in system 100. In particular, as described further below with reference to FIGS. 7 and 8, A/V hub 112 may determine the current state of one or more of the components in system 100, such as the current state of A/V display device 114-1, one of the one or more speakers 116 and/or one of the one or more content sources 126. This device-state information may be determined by A/V hub 112 using hardware and/or software, and A/V hub 112 may determine the device-state information even for legacy electronic devices that are only capable of receiving commands or instructions (i.e., that are only capable of unidirectional communication). For example, as described further below with reference to FIGS. 7 and 8, whether or not a given component or electronic device in system 100 is electrically coupled to A/V hub 112 may be determined using a state-detection circuit that detects whether there is electrical coupling between the electronic device and an input connector to A/V hub 112 (such as an HDMI connector or port that can be electrically coupled to HDMI cable 122). If the electrical coupling is detected, the type of the given electronic device (such as a television, a DVD player, a satellite receiver, etc.) and/or the manufacturer or provider of the given electronic device may be determined by A/V hub 112 by providing a series of commands or instructions to the given electronic device (e.g., such as commands or instructions that are specific to a particular type of electronic device, specific to a particular manufacturer, and/or consumer-electronics-control commands in the HDMI standard or specification), and then monitoring, as a function of time, changes in a data stream (as indicated by the number of packets or frames and/or the payloads in the packets or frames) to and/or from the given electronic device to see if there was a response to a particular command or instruction. Moreover, the state-detection circuit may determine whether the given electronic device is in the power-on state or the power-off state by monitoring a voltage, a current and/or an impedance on, through or associated with one or more pins in the input connector. Alternatively or additionally, A/V hub 112 may determine whether the given electronic device is in the power-on state or the power-off state by monitoring, as a function of time, the data stream (as indicated by the number of packets or frames and/or the payloads in the packets or frames) to and/or from the given electronic device. Similarly, A/V hub 112 may determine the current state of the given electronic device, such as whether the given electronic device responded to a command or instruction that was provided to the given electronic device by A/V hub 112, by monitoring, as a function of time, changes in the data stream (as indicated by the number of packets or frames and/or the payloads in the packets or frames) to and/or from the given electronic device. Thus, the device-state information for the given electronic device determined by A/V hub 112 may include: presence or absence information (such as whether there is electrical coupling or a wireless connection with the given electronic device), identity information (such as the type of the given electronic device and/or the manufacturer of the given electronic device) and/or the current state.

Using the device-state information A/V hub 112 and/or portable electronic device 110 may dynamically adapt the user interface displayed on touch-sensitive display 124 on portable electronic device 110. For example, A/V hub 112 may provide, via radio 118-2, device-state information to portable electronic device 110 specifying a current state of the given electronic device. (Thus, this feedback technique may include bidirectional or two-way communication between A/V hub 112 and portable electronic device 110.) After radio 118-1 receives the device-state information, portable electronic device 110 (such as a program module or program instructions executed in an environment, e.g., an operating system, in portable electronic device 110) may generate a user interface that includes one or more virtual command icons associated with the current state and one or more related states of the given electronic device. (Alternatively, portable electronic device 110 may selected a predefined or predetermined user interface.) Note that the one or more related states may be related to the current state in a state diagram (which may be stored in memory in portable electronic device 110) by corresponding operations that transition the given electronic device from the current state to the one or more related states. Then, portable electronic device 110 may display the user interface on touch-sensitive display 124.

In some embodiments, A/V hub 112 provides information specifying the type of the given electronic device, the manufacturer of the given electronic device, and/or context information that specifies a context of content (such as A/V content or information specifying a content provider) displayed on the given electronic device (such as on a display in A/V display device 114-1). For example, the context may include a type of the A/V content (such as sports, television, a movie, etc.), a location in the A/V content (such as a timestamp, an identifier of a sub-section in the content and/or a proximity to a beginning or an end of the A/V content), etc. In these embodiments, the one or more virtual command icons (and, thus, the user interface) may be based on the type of the given electronic device, the manufacturer and/or the context. Thus, only virtual command icons that are relevant to the given electronic device, the manufacturer and/or the context may be included in the user interface. For example, if the user selects or activates a content source (such as a channel) that is associated with a particular content provider, the user interface may include a series of virtual command icons at different locations in the user interface that are associated with different A/V content from the content provider. In addition, the user interface may include images (such as thumbnail images) of the A/V content proximate or adjacent to the virtual command icons.

Moreover, when the user activates one of the virtual command icons in the user interface, the touch-screen I/O controller in portable electronic device 110 may provide user-interface activity information specifying activation of a virtual command icon in the one or more virtual command icons, where the activation of the virtual command icon specifies a transition of the given electronic device from the current state to a new current state in the state diagram. As noted previously, the activation of the virtual command icon may involve a user of portable electronic device 110 contacting touch-sensitive display 124 within a strike area of the virtual command icon and then releasing the contact. In response to receiving the user-interface activity information, portable electronic device 110 may: request the A/V content associated with the virtual command icon, modify the user interface to change the one or more virtual command icons based on the new current state; and display the modified user interface on touch-sensitive display 124. Note that portable electronic device 110 may wait to change the one or more virtual command icons until the device-state information received from A/V hub 112 indicates that the given electronic device has transitioned to the new current state in response to a command or an instruction associated with the activation of the one of the virtual command icons. Thus, portable electronic device 110 may repeatedly perform the generating and the displaying operations so that the user interface is dynamically updated as the current state changes.

Alternatively or additionally, instead of portable electronic device 110 generating the user interface, A/V hub 112 may generate user-interface information that specifies the user interface (or instructions specifying objects or graphical information in the user interface) based on the one or more related states in the state diagram (which may be stored in memory in A/V hub 112) and one or more of: the device-state information, the type of the given electronic device, the manufacturer of the given electronic device, the context, user-interface activity information specifying activation (by the user) of one of the virtual command icons in the user interface (which may be received, via radio 118-2, from portable electronic device 110), and/or a display format in portable electronic device 110. (Alternatively, instead of generating the user interface, A/V hub 112 may select a predefined or predetermined user-interface information.) Then, A/V hub 112 may provide, via radios 118, the user-interface information to portable electronic device 110 for display on touch-sensitive display 124.

In this way, the user interface may be dynamically updated as the components in system 100 respond to commands or instructions received from portable electronic device 110 and/or A/V hub 112, so that the currently relevant one or more virtual icons are included in the user interface. This capability may simplify the user interface and make it easier for the user to navigate through and/or use the user interface.

Figure 2:
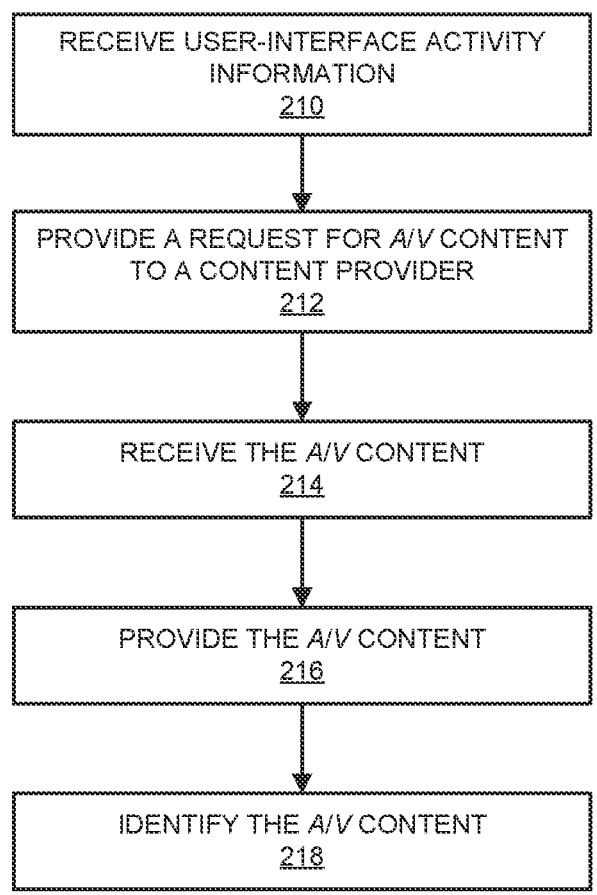
FIG. 2 is a flow diagram illustrating a method for identifying audio/video (A/V) content in accordance with an embodiment of the present disclosure.

Moreover, as described further below with reference to FIGS. 2-4, some of content providers may indirectly specify a set of A/V content (such as a set of HDMI content) that they provide (such as a group of movies, television programs, and/or entertainment events, e.g., concerts or sporting events), but they may not explicitly or directly indicate the A/V content. For example, a content provider may provide a user interface format with virtual command icons (or physical knobs or icons) at different locations in the user interface that are associated with (from the perspective of A/V hub 112) unknown A/V content. If user-interface-activity information received from portable electronic device 110 indicates that a user has selected or activated a virtual command icon at a particular location in the user interface and A/V hub 112 provides information specifying this location to a content source (such as content source 126-1) that is associated with the content provider, the content provider may provide (via content source 126-1) the requested A/V content. Then, A/V hub 112 can determine display instructions (with a display layout) for the A/V content (such as a display layout that is based on a format of a display in one of A/V display devices, e.g., A/V display device 114-1), and can provide the display instructions and the A/V content to A/V display device 114-1 for display. (Alternatively, A/V hub 112 can use pre-determined display instructions or A/V hub 112 can modify or transform the A/V content based on the display layout so that the modified or transformed A/V content has an appropriate format for display on the display.)

However, from the perspective of A/V hub 112, the A/V content may still be unknown (i.e., A/V hub 112 may only 'know' indirect information that is associated with the A/V content, such as the location in the user interface). Thus, A/V hub 112 may not know the specific movie, television program, sporting event, entertainment event, etc. that the user selected. This ignorance may restrict the ability of A/V hub 112 to offer value-added services to the user, such as automating program recording, program offering and/or program selection on behalf of the user based on a history of user selections or activity when using A/V hub 112. In addition to an opportunity cost, the ignorance may also degrade the user experience, because the user may be forced to perform operations when using portable electronic device 110 and/or A/V hub 112, which can increase user frustration and, thus, may degrade the user experience.

In order to address this problem, A/V hub 112 may analyze additional information to directly identify the A/V content. For example, the content provider may provide a set of images (such as thumbnails) that are associated with the A/V content, and which are presented proximate to or adjacent to the locations and the virtual command icons in the user interface on portable electronic device 110. Then, when the user activates a virtual command icon at a location, the associated image may be analyzed to identify the selected A/V content. The image analysis may include optical character recognition of text in the image (such as a title of the A/V content, an actor in the A/V content, a director or a producer of the A/V content, etc.). In some embodiments, the image analysis includes a correction for tilting or a two- or three-dimensional orientation or rotation of the image, so that the image is transformed to a different two-dimensional plane that facilitates the image analysis. Furthermore, the image analysis may include pattern matching with a predefined group of A/V content provided by the content provider and/or face recognition of an actor in the predefined group of A/V content. In particular, the A/V content available from the content provider may be finite (such as a library with a finite number of movies or a broadcast or transmission schedule with a finite number of television programs, cable-television programs, sporting events or entertainment events), and this bound may be used to constrain (and, therefore, to simplify) the image analysis. Thus, instead of trying to identify the selected A/V content from tens of thousands of possible titles, the set of possible A/V content may be restricted to a few hundred titles available from the content provider or that the content provider is currently providing (which, as described further below with reference to FIG. 6, may be used as a so-called 'model library' during the identification).

In some embodiments, the identification (or classification) involves analysis of audio or audio information and/or video or video information (e.g., at least portion of one or more images) in the selected A/V content. Note that image analysis may be understood to be extracting meaningful information from image information, such as by using digital image processing. For example, the image analysis may include: optical character recognition or text recognition, two-dimensional object recognition, three-dimensional object recognition, image segmentation, motion detection, face recognition, etc. In some embodiments, the image analysis includes: computing the Levenshtein distance between text in the image and text in a set of images provided by the content provider, computing a histogram of one or more images in the A/V content, computing a Fourier transform of one or more images in the A/V content (and, more generally, performing another type of transformation on the A/V content), identifying individuals (e.g., based on their behaviors relative to stored historical behaviors, face recognition analysis, etc.), comparing descriptors in one or more images with a feature data structure (which is sometimes referred to as a 'model library') using an object-detection or recognition technique (such as: scale invariant feature transform (SIFT), speed-up robust features (SURF), a binary descriptor (such as ORB), binary robust invariant scalable keypoints (BRISK), fast retinal keypoint (FREAK), etc.), performing video analysis (using a video-analysis technique such as: optical flow, a bag of systems representation, probabilistic kernels for the classification of auto-regressive visual processes, a mixture of dynamic textures, a histogram of oriented gradients, clouds of space-time interest points, mined hierarchical compound features, boosting efficient motion features, pyramid of histogram of gradients, scale-invariant feature transform, color histograms, bag of visual words representation, scene classification, face recognition, object recognition, etc.), and/or another analysis technique. In general, the text and video analysis may involve analyzing image information to determine one or more image features that characterize the image and/or the A/V content, which are then, respectively, compared to one or more image features associated with the set of images or the set of A/V content from the content provider to identify the A/V content based on the best match.

Similarly, audio analysis may be understood to be extracting meaningful information from audio information and/or sound, such as by using digital signal processing. This audio analysis may involve analyzing audio information to determine acoustic features that characterize the audio information, which are then compared to acoustic features associated with the set of A/V content from the content provider to identify the A/V content based on the best match. Note that the acoustic features may specify: time-domain information, frequency-domain information, spectral content, Mel frequency cepstral coefficients, Mel spectrum, cepstrum, chroma features, a spectral flux, a spectral flatness, a zero-crossing rate, an attack-time, a temporal increase, a temporal decrease, an effective duration, a temporal centroid, an energy modulation, a frequency modulation of an energy envelope, one or more auto-correlation coefficients, energy information (such as: global energy, harmonic energy, noise energy), a root-mean-square level, a bandwidth, a band-energy ratio, a delta spectrum magnitude, a pitch, a pitch strength, a spectral centroid, a spectral spread, a spectral skewness, a spectral kurtosis, a spectral slope, a spectral decrease, a spectral roll-off, a spectral variation, a fundamental frequency, noisiness, inharmonicity, a harmonic spectral deviation, an odd-to-even harmonic energy ratio, a harmonic tristimulus, a total loudness, a specific loudness, a relative specific loudness, a roughness, a sharpness, a spread, a spectral crest factor, temporal statistics (such as: the mean, variance, and/or deviation), and/or acoustic features based on gammatone filters. Thus, the acoustic features may be used to identify an actor in the A/V content based on their voice or vocal characteristics and/or what they say in the A/V content (e.g., using a voice-recognition technique and a corpus of dialog in the set of A/V content).

In some embodiments, the acoustic features include first, second and/or higher order instantaneous derivatives of one or more of the preceding specified information. Alternatively or additionally, the acoustic features may be determined using a pooling function over sets of several acoustic features extracted at different temporal locations of the audio information, where the pooling function can be, but is not restricted to: maximum, minimum, variance, standard deviation, mean, higher-order moments, higher-order centered moments, median, $(1-x) \cdot 100$ percentiles (where x is a percentile, an order statistic and/or more generally any summary statistic related to the value of any given acoustic feature), and/or integrals over the sets of features. Other embodiments may include a bag of features and/or a permutation feature computed from one or more of the preceding specified information and acoustic features. For example, given a spectral feature that represents the energy of the audio information in different frequency bands, a permutation feature may be computed by sorting the frequency bands based on their energy, and using the result of ranking the frequency bands as the permutation feature. Furthermore, statistical models computed from one or more of the preceding specified information and features may be used as acoustic features. In this case, given a set of features for the A/V content that are computed at the same and/or different temporal locations in the audio information, the audio information may be represented using a statistical model that describes the shape of the distribution of the set of features. Additionally, the features may include one or more sets of weights, derived from one or more of the preceding specified information, features and statistical models for the audio information in one or more instances of A/V content (such as in the set of A/V content). For example, cleaner and more robust identification for a particular instance of A/V content can be produced by modeling the co-occurrences/correlations of different features for several instances of A/V content. In particular, given A/V content and set of statistical models representing a predefined set of related or similar A/V content, the audio information in the new A/V content can be represented by a set of weights for the predefined set of A/V content. This set of weights may represent a high-level feature that can subsequently be used in a second stage of statistical modeling of the set of A/V content. In some embodiments, features derived by automatic recognition of speech and/or individuals that are talking from the audio information or from other features that characterize the audio information may be used in the content-analysis technique.

More generally, the image features and/or the acoustic features may be determined using an unsupervised learning technique. For example, the acoustic or image features may include absolute or relative counts of prototype acoustic or visual patterns, where the prototype acoustic or visual patterns may be learned from possibly large amounts of unlabeled data using unsupervised learning techniques such as: deep belief nets, clustering, vector quantization, and/or wavelets.

In these ways, the content-analysis technique may allow automated identification of selected A/V content even when a content provider of the A/V content does not explicitly share this information with A/V hub 112. This capability may allow A/V hub 112 to build a robust history of user selections or activity when using A/V hub 112, which in turn may allow value-added services to be provided to the user, such as automating program recording, program offering and/or program selection on behalf of the user. Consequently, the content-analysis technique may reduce user frustration and/or may improve the user experience when using portable electronic device 110, A/V hub 112, the one or more of A/V display devices 114, the one or more speakers 116 and/or the one or more content sources 126.

While the preceding embodiments illustrated the content-analysis technique with A/V content that is to be displayed on one of A/V display devices 114, in other embodiments the content-analysis technique may be used with audio content that is to be output by one or more of speakers 116. For example, a user may select initially unknown audio content (such as music) by making a selection at a location in a user interface. Then, while requesting and providing the selected audio content to one or more of speakers 116 (such as by providing a request that specifies the location to one of content sources 126), A/V hub 112 (or another component in system 100) may perform the content-analysis technique to identify the selected audio content.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames. While portable electronic device 110 and A/V hub 112 are illustrated with a single instance of radios 118, in other embodiments portable electronic device 110 and A/V hub 112 (and optionally one or more of the one or more A/V display devices 114, the one or more of speakers 116 and/or the one or more content sources 126) may include multiple radios.

We now describe embodiments of a content-analysis technique. FIG. 2 presents a flow diagram illustrating a method 200 for identifying A/V content, which may be performed by an A/V hub, such as A/V hub 112 (FIG. 1). During operation, the A/V hub (such as a control mechanism, a control circuit or control logic, e.g., a processor executing a program module or program instructions and/or or a circuit) receives, via an interface circuit in the A/V hub, user-interface activity information (operation 210) from the portable electronic device that specifies a selection at a location in a user interface (which may be displayed on the portable electronic device), where an image in a set of images is displayed proximate to the location (i.e., at or near to the location, such as a distance that is less than the inter-image distance in a user interface), and the image is associated with A/V content, which is initially unknown to the A/V hub, from a content provider. Then, the A/V hub provides, via the interface circuit, a request to the content provider (operation 212) with information that specifies the location.

In response to the request, the A/V hub receives, via the interface circuit, the A/V content (operation 214) from the content provider, and the A/V hub provides the A/V content (operation 216) to an A/V display device. Next, the A/V hub identifies the A/V content (operation 218) by performing analysis (such as image analysis) on the image based on predefined available A/V content from the content provider.

In some embodiments, prior to providing the A/V content (operations 216), the A/V hub optionally transforms the second A/V content from an initial format that is compatible with an initial communication protocol to a different communication protocol. For example, the A/V hub may transform or convert the second A/V content from an initial format that is compatible with a Transmission Control Protocol/Internet Protocol (TCP/IP) communication protocol to a format that is compatible with HDMI.

Figure 3:
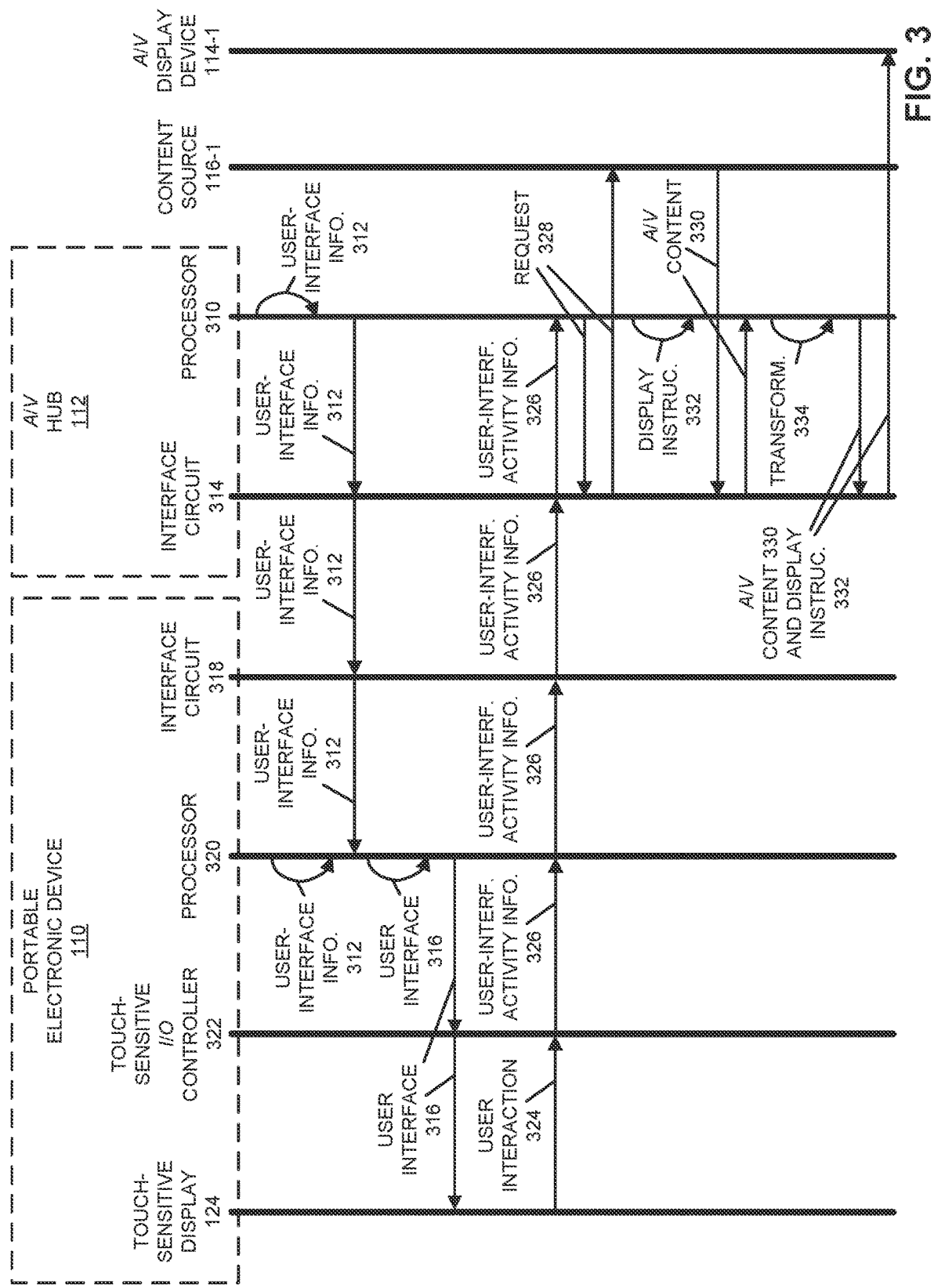
FIG. 3 is a drawing illustrating communication among the electronic devices in FIG. 1 in accordance with an embodiment of the present disclosure.

FIG. 3 is a drawing illustrating communication among portable electronic device 110, A/V hub 112, A/V display device 114-1 and content source 126-1. In particular, processor 310 may optionally generate user-interface information 312 that specifies a user interface that includes one or more virtual command icons, including a virtual command icon, which are associated with content source 126-1. Then, processor 310 may optionally provide, via interface circuit 314, user-interface information 312 to portable electronic device 110. After receiving user-interface information 312, portable electronic device 110 may optionally display associated user interface 316 on a touch-sensitive display (such as touch-sensitive display 124 in FIG. 1) in portable electronic device 110. However, in other embodiments user-interface information 312 is optionally generated by portable electronic device 110.

For example, interface circuit 318 in portable electronic device 110 may receive user-interface information 312, which is then provided to processor 320. Alternatively, processor 320 may generate user-interface information 312. Then, based on user-interface information 312, processor 320 may provide information specifying user interface 316 to touch-sensitive input/output (I/O) controller 322, which provides the information specifying user interface 316 to touch-sensitive display 124.

Moreover, touch-sensitive display 124 may provide information specifying user interaction 324 to touch-sensitive I/O controller 322. In turn, touch-sensitive I/O controller 322 may interpret the information specifying user interaction 324 to determine user-interface activity information 326. For example, user-interface activity information 326 may specify user selection of content source 126-1, such as user activation of the virtual command icon associated with content source 126-1. Touch-sensitive I/O controller 322 may provide user-interface activity information 326 to processor 320, which may provide user-interface activity information 326 to interface circuit 318.

Next, portable electronic device 110 (e.g., via interface circuit 318) may provide user-interface activity information 326 to A/V hub 112. After receiving user-interface activity information 326, interface circuit 314 may provide user-interface activity information 326 to processor 310. In response, processor 310 may instruct interface circuit 314 to provide request 328 for A/V content 330 (such as the A/V content) to content source 126-1. This request may be based on the virtual command icon that was activated or a location of the virtual command icon in the user interface (i.e., without explicit or direct knowledge of the A/V content). In addition, processor 310 may optionally determine display instructions 332 based on a format of a display in A/V display device 114-1. Alternatively, display instructions 332 may be predetermined or predefined.

After receiving request 328, content source 126-1 may provide A/V content 330 to A/V hub 112. Next, interface circuit 314 may optionally provide A/V content 330, which may optionally convert or transform 334 A/V content 330 from one format to another, such as from a format compatible with a TCP/IP communication protocol to a format compatible with a different communication protocol, such as HDMI. Moreover, interface circuit 314 may provide A/V content 330 and/or display instructions 332 (which may be provide differentially when there or changes or regularly, such as in each packet or in one of every N packets) to A/V display device 114-1 as frames with A/V content 330 are received from content source 126-1, so that A/V content 330 is displayed on the display in A/V display device 114-1. (Alternatively, in some embodiments interface circuit 314 provides A/V content 330 to processor 310, which instructs interface circuit 314 to provide A/V content 330 and display instructions 332 to A/V display device 114-1 as frames with A/V content 330 are received from content source 126-1.)

Figure 4:
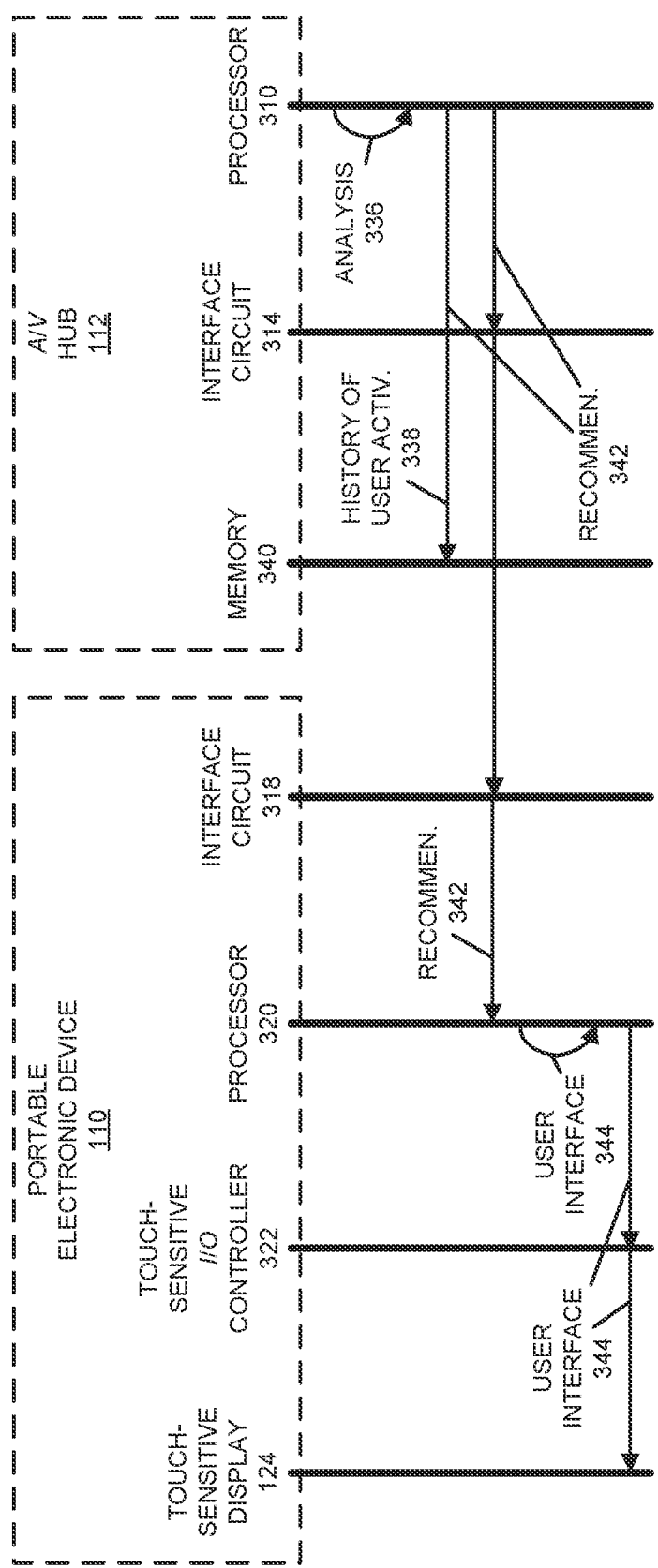
FIG. 4 is a drawing illustrating communication among the electronic devices in FIG. 1 in accordance with an embodiment of the present disclosure.

As shown in FIG. 4, which is a drawing illustrating communication among portable electronic device 110 and A/V hub 112, processor 310 may perform analysis 336 an image (such as a thumbnail image) associated with the virtual command icon, the location of the virtual command icon in user-interface information 312 and/or A/V content 330 to identify A/V content 330. In some embodiments, analysis 336 includes analyzing audio and/or images in A/V content 330. Based on the identified A/V content 330, processor 310 may update a history of user activity 338 stored in memory 340 (which may be local memory in A/V hub 112 and/or remotely located memory, such as a cloud-based memory) and/or may provide a service for the user to portable electronic device 110. For example, the service may include recommend A/V content that may be of interest to the user. This recommendation 342 may be received by interface circuit 318, forwarded to processor 320, and then displayed in user interface 344 on touch-sensitive display 124 by touch-sensitive I/O controller 322.

Figure 5:
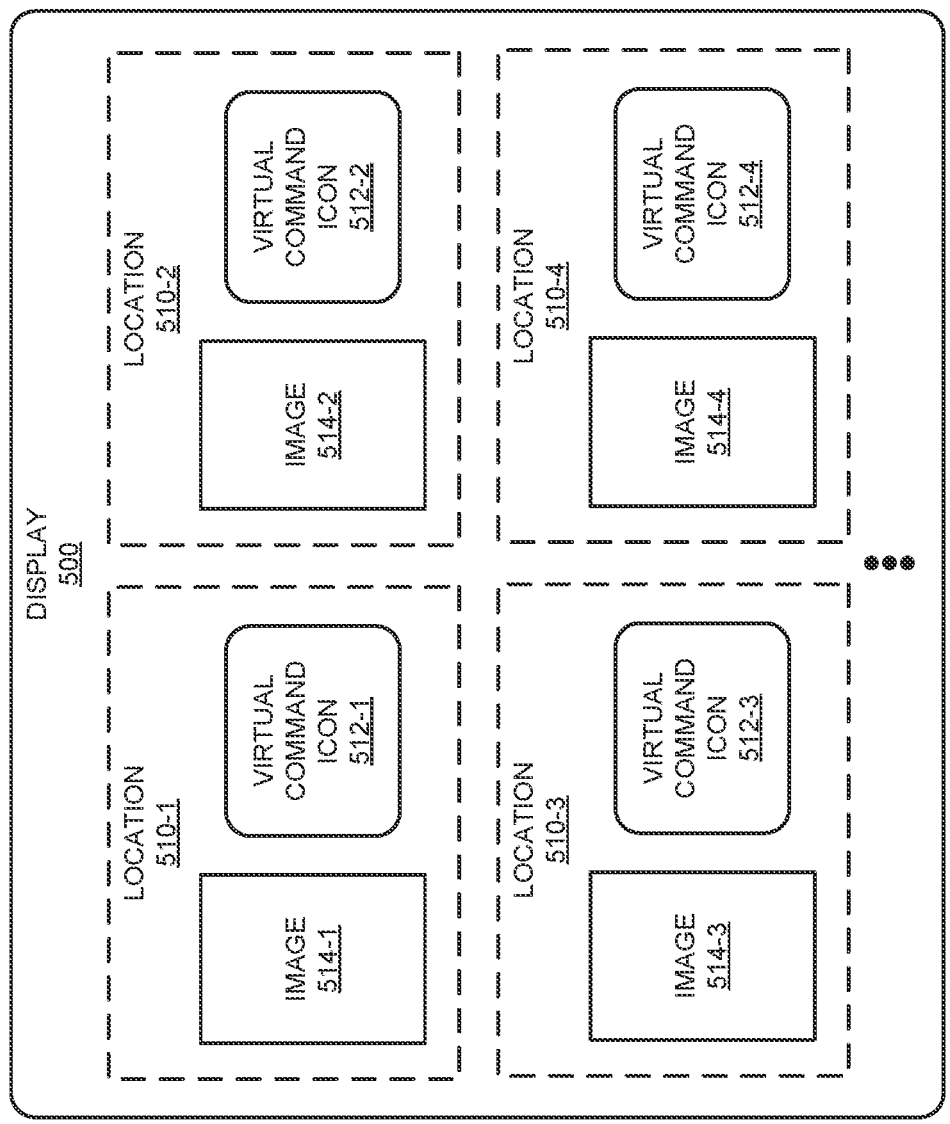
FIG. 5 is a drawing illustrating a user interface in a portable electronic device of FIG. 1 in accordance with an embodiment of the present disclosure.

While FIGS. 4 and 5 are illustrated with single or dual-sided arrows that, respectively indicate unidirectional or bidirectional communication, in general any of the operations in FIGS. 4 and 5 may be unidirectional or bidirectional.

In an exemplary embodiment, the selected A/V content is a movie is a group of movies provided by a content provider via content source. As shown in FIG. 5, these movies may be offered to the user in a user interface 500 in portable electronic device 110 (FIG. 1). For example, user interface 500 may include virtual command icons 512 (such as virtual 'play' buttons) at locations 510 that are associated with the group of movies. In particular, a given virtual command icon at a given location (such as virtual command icon 512-1 at location 510-1) may be associated with one of the movies. In addition, user interface 500 may include images 514 (such as thumbnail images) that are associated with the movies and that provide a visual indicator or clue which as to the movie associated with a particular virtual command icon. Thus, images 514 may be displayed proximate or adjacent to virtual command icons 512, and may include text (such as a movie title) and/or promotional material (such as an image of a poster or an advertisement for a movie).

Figure 6:
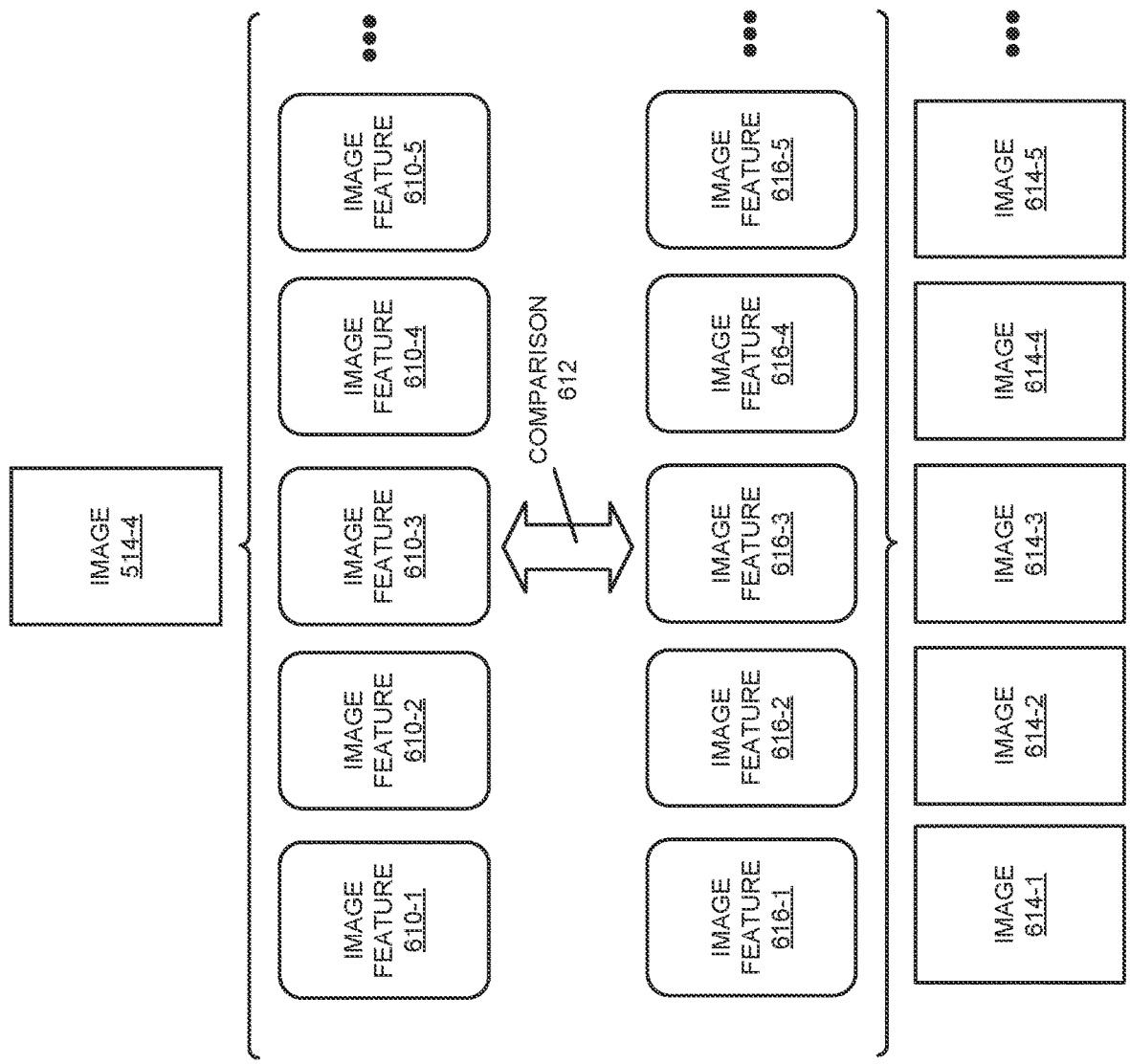
FIG. 6 is a drawing illustrating the identification of A/V content in accordance with an embodiment of the present disclosure.

When a user selects one of the movies by activating one of virtual command icons 512 (such as virtual command icon 512-4), the A/V hub may analyze image 514-4 to identify the movie. This is shown in FIG. 6, which presents a drawing illustrating the identification of A/V content 600. In particular, one or more image features 610 may be determined or extracted from image 514-4. For example, the one or more image features 610 may be determined using a text-detection technique and/or a text-recognition technique. Thus, the one or more image features 610 may include a title of the movie, the name of an actor in the movie, etc. Then, the one or more image features 610 may be compared 612 with one or more image features 616 that were determined or extracted from images 614 that are associated with a predefined set of A/V content that is currently available from a content provider. (Thus, images 614 may be used as a reference or model library during the identification process.) For example, the set of A/V content may include the movies offered by the content provider or the movies offered by the content provider at a particular time (such as based on a broadcast or transmission schedule of the content provider). Based on the best match between the one or more image features 610 and the one or more image features 616 (such as a smallest Levenshtein distance), one of the set of A/V content may be identified.

In this way, the content-analysis technique may allow the A/V hub to track user activity and A/V content selections, and to use this information to provide value-added services to the user. For example, the identified A/V content may be added to a history of user activity or selections, and this history may be used to automate future operations for the user. Thus, the A/V hub may use the history to determine which A/V content to: record or store for the user, recommend to the user and/or provide to the user at different locations, times of day, days of the week, etc. This capability may make it easier and more intuitive for a user to view A/V content using the A/V hub with a minimum of effort, thereby reducing user frustration and, thus, improving user satisfaction when using the portable electronic device, the A/V hub, and/or one or more A/V display devices. Consequently, method 200 (FIG. 2) may improve the user experience when using the portable electronic device and/or the A/V hub.

In some embodiments of method 200 there are additional or fewer operations. Moreover, the order of the operations may be changed, and/or two or more operations may be combined into a single operation. Furthermore, one or more operations may be modified. For example, additionally, display instructions may be provided to an A/V display device differentially (such as when the display instructions change), regularly or periodically (such as in one of every N packets or in a packet in each frame) or in each packet.

Note that in this content-analysis technique the A/V hub may display the A/V content to an arbitrary A/V display device (including an A/V display device that is located remotely from the A/V hub, such as in another room) without a need for a separate set-top box that is located proximate to the A/V display device. Instead, the A/V hub may perform all of the frame-by-frame transcoding of the video content that is needed for the A/V display device to display the video content before providing the video content to the A/V display device. Thus, in contrast with many existing cable and satellite systems, the A/V hub may provide video content to multiple A/V display devices (such as N A/V display devices) without the use of N associated set-top boxes. Consequently, the A/V hub may eliminate the need for a separate set-top box in the same room as an A/V display device (although there may be a local wireless receiver that is associated with the A/V hub). This capability may be enabled by the knowledge of the device state information and the content selected by the users that is available to the A/V hub. In addition, this capability may eliminate the need for a user to know where or how a particular A/V display device is connected to a content source, such as cable television, a satellite dish or a security camera.

While the preceding embodiments illustrated the A/V hub performing the content-analysis technique, in some embodiments some or all of the operations in the content-analysis technique are performed remotely, such as by a cloud-based computer (such as a server or a computer that is accessed via network 128 in FIG. 1, e.g., the Internet).

Figure 7:
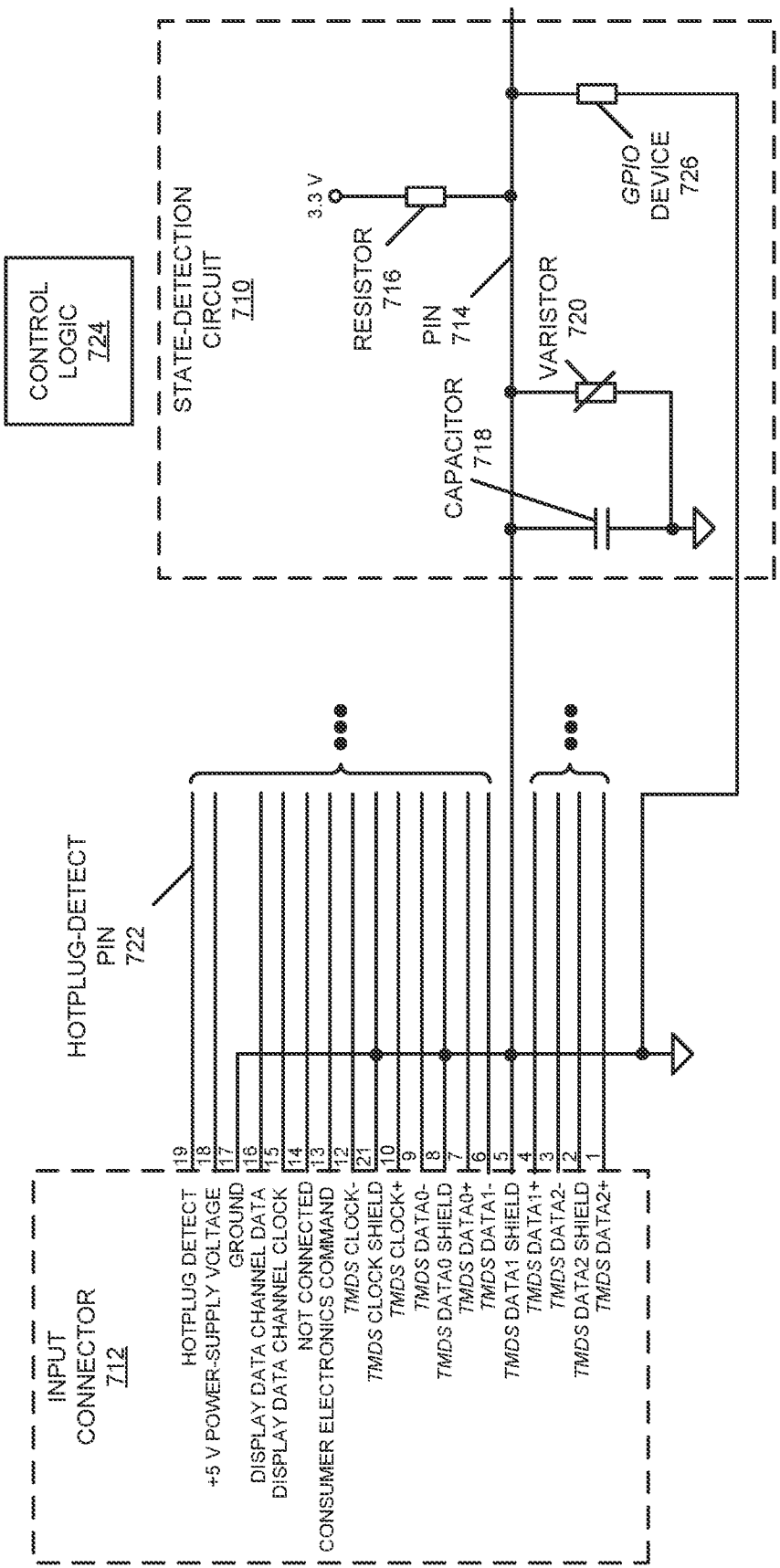
FIG. 7 is a block diagram illustrating a state-detection circuit in one of the electronic devices of FIG. 1 in accordance with an embodiment of the present disclosure.

We now describe embodiments of determining device-state information. As noted previously, the device-state information (such as whether an electronic device is: electrically coupled to A/V hub 112 in FIG. 1, in a power-on state, in a power-off state, and/or another state, e.g., a playback state, a pause state, a stop state, etc.) may be determined using hardware (such as a state-detection circuit) and/or software (which may be executed by a processor and, more generally, a control mechanism or a control circuit). FIG. 7 presents a block diagram illustrating a state-detection circuit 710 in A/V hub 112 (FIG. 1). In A/V hub 112 (FIG. 1), input connector 712 (which may be compatible with an HDMI standard) may be electrically coupled to an electronic device. State-detection circuit 710 may be coupled to at least pin 714 in input connector 712, so that, when the electronic device is electrically coupled to input connector 712, state-detection circuit 710 establishes a ground loop between A/V hub 112 (FIG. 1) and the electronic device. For example, pin 714 may include a transition minimized differential signaling (TMDS) data1 shield. (Alternatively, pin 714 may include a TMDS data1 shield.) Moreover, state-detection circuit 710 may include: an energy-dissipation component (such as resistor 716) electrically coupled to a power-supply voltage and pin 714 (which may provide electrostatic-discharge protection); an energy-storage component (such as capacitor 718) electrically coupled to pin 714 and ground; and a bi-directional voltage clamp (such as varistor 720 or a Verner diode), in parallel with capacitor 718, electrically coupled to pin 714 and ground. For example, resistor 716 may be 150 kΩ and capacitor 718 may be 0.047 μF. In some embodiments, state-detection circuit 710 includes a general-purpose input/output (GPIO) device 726 coupled to pin 714. The behavior (such as an input pin, an output pin, enabled or disabled) of GPIO device 726 may be controlled using control signals or instructions from control logic 724.

Figure 8:
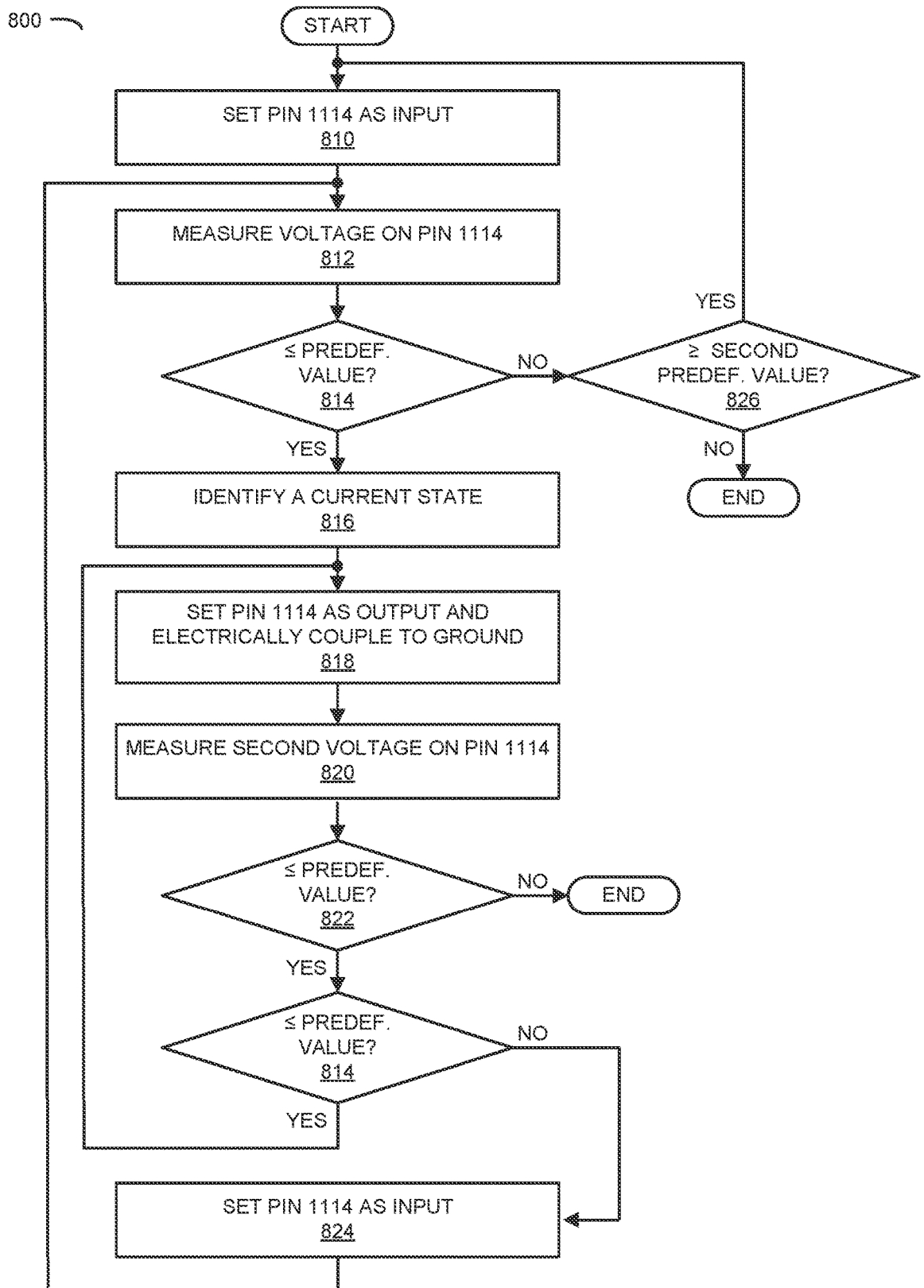
FIG. 8 is a flow diagram illustrating a method for detecting an electronic device in accordance with an embodiment of the present disclosure.

FIG. 8 presents a flow diagram illustrating a method 800 for detecting an electronic device, which may be performed by an A/V hub (such as A/V hub 112 in FIG. 1) using state-detection circuit 710 in FIG. 7. During operation, a control mechanism or a control circuit (such as a processor and/or control logic 724, which may be included in or external to state-detection circuit 710) in A/V hub 112 (FIG. 1), which is electrically coupled to input connector 712, detects whether there is electrical coupling between the electronic device and input connector 712 using state-detection circuit 710 (FIG. 7). In particular, detecting whether there is electrical coupling between the electronic device and input connector 712 may involve: setting pin 714 as an input (operation 810), where pin 714 is then pulled to a power-supply voltage by control logic 724; measuring a voltage on pin 714 (operation 812) using control logic 724; and detecting the electrical coupling between the electronic device and input connector 712 when the voltage on pin 714 is less than or equal to a predefined value (operation 814), such as when the voltage is approximately ground, using control logic 724. Note that, when the electrical coupling between the electronic device and input connector 712 is detected, control logic 724 may: set pin 714 as an output and electrically couple pin 714 to ground (operation 818), which may improve signal integrity; and measure a second voltage (operation 820) on hotplug-detect pin 722 in input connector 712. When the second voltage on hotplug-detect pin 722 is less than or equal to the predefined value (operation 822), control logic 724 may set pin 714 as an input (operation 824) and repeat the measurement of the voltage on pin 714 (operation 812). Alternatively, when the voltage equals or exceeds a second predefined value (operation 826), such as when the voltage is approximately the power-supply voltage, control logic 724 may repeat detecting whether there is electrical coupling between the electronic device and input connector 712. Furthermore, when the voltage is less than or equal to the predefined value (operation 814), control logic 724 may identify a current state (operation 816) of the electronic device, such as: a power-off state, and a standby state. For example, control logic 724 may provide the set of first control commands, provide the set of second control commands, and/or may monitor (via one or more pins in input connector 712) content activity, such as a data stream to and/or from the electronic device. Thus, control logic 724 may determine that the electronic device is: in the power-off state when there is no a data stream; in the standby state when the data stream has a low data rate; and in the playback state when the data stream has a data rate associated with A/V content and/or includes the A/V content. Note that, when the second voltage on hotplug-detect pin 722 is less than or equal to the predefined value (operation 822) and when the voltage is less than or equal to the predefined value (operation 814), control logic 724 may repeat setting pin 714 as the output and electrically coupling pin 714 to ground (operation 818).

When the electrical coupling between the electronic device and input connector 712 is detected, control logic 724 may optionally attempt to identify the electronic device by providing consumer-electronics-control commands (which may be compatible with an HDMI standard) to the electronic device. Alternatively or additionally (such as when the attempt is unsuccessful), control logic 724 may provide a set of first control commands associated with different types of electronic devices until, in response, content activity (such as packets or frames associated with a data stream of content communicated to and/or from the electronic device) is detected by control logic 724 via input connector 712. For example, the set of first commands may include: a play command for the different types of electronic devices; and/or a trick-mode command (such as fast forward, reverse, fast reverse, or skip) for the different types of electronic devices. Moreover, when the content activity is detected, control logic 724 may provide a set of second control commands associated with different providers of electronic devices until a change in a state of the electronic device is detected by control logic 724 via input connector 712 and state-detection circuit 710. The set of second control commands may include: power-on control commands for the different providers of electronic devices; and/or power-off control commands for the different providers of electronic devices.

Alternatively or additionally, during operation control logic 724 may detect whether there is electrical coupling between the electronic device and input connector 712 using state-detection circuit 710 (FIG. 7). When the electrical coupling between the electronic device and input connector 712 is detected, control logic 724 may: set pin 714 as an output and electrically couple pin 714 to ground; and measure the second voltage on hotplug-detect pin 722 in input connector 712. When the second voltage on hotplug-detect pin 722 is less than or equal to the predefined value, control logic 724 may set pin 714 as an input and measure a voltage on pin 714. Moreover, when the voltage equals or exceeds the second predefined value, control logic 724 may repeat detecting whether there is electrical coupling between the electronic device and input connector 712. Furthermore, when the voltage is less than or equal to the predefined value, control logic 724 may identify the current state of the electronic device. In some embodiments, control logic 724: provides a control command to the electronic device; and identifies an additional state of the electronic device based on content (such as A/V content) that is provided and/or received by the electronic device in response to the control command. For example, the control command may include: a play command, and/or a trick-mode command (such as fast forward or fast skip, slow forward or slow skip, fast reverse, or slow reverse).

Figure 9:
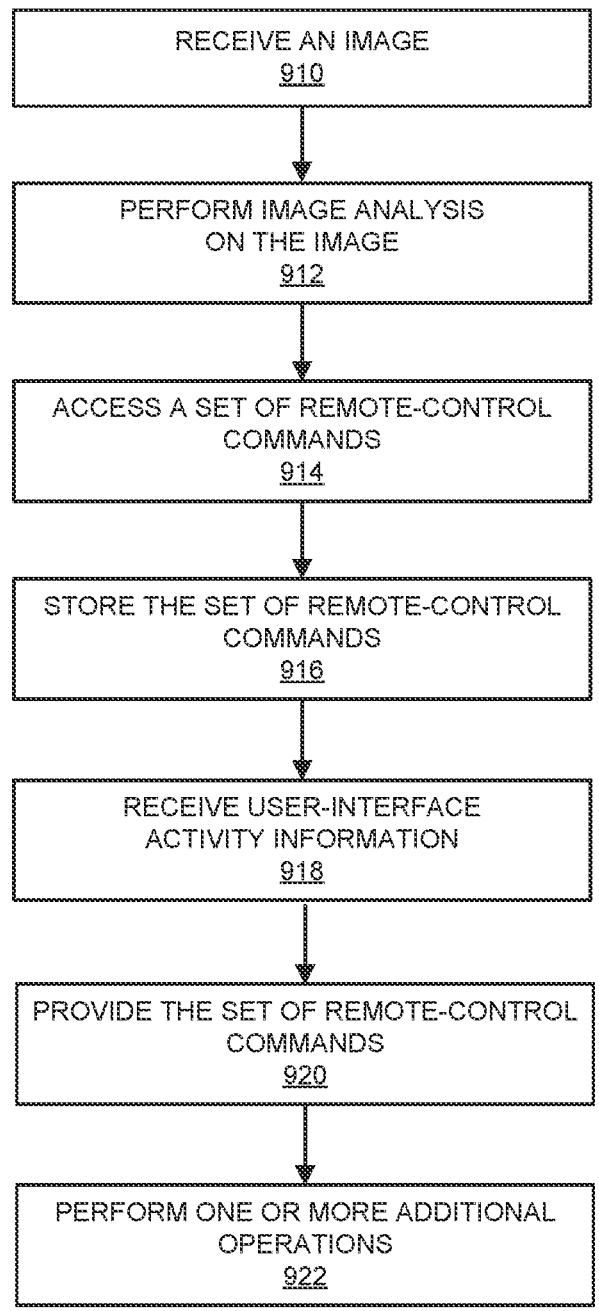
FIG. 9 is a flow diagram illustrating a method for obtaining a set of remote-control commands in accordance with an embodiment of the present disclosure.

FIG. 9 presents a flow diagram illustrating a method 900 for obtaining a set of remote-control commands, which may be performed by an A/V hub, such as A/V hub 112 (FIG. 1), an A/V display device, such as A/V display device 114-1 (FIG. 1), and more generally an electronic device. During operation, the electronic device (such as a control mechanism, a control circuit or control logic, e.g., a processor executing a program module or program instructions and/or or a circuit) may receive an image (operation 910) from a second electronic device (e.g., a radio receiver, a video player, a satellite receiver, an access point that provides a connection to network 128 in FIG. 1, such as the Internet, a media or a content source, a consumer-electronic device, an entertainment device, a set-top box, a cable-television box, an electronic device that delivers over-the-top content via the Internet or network 128 in FIG. 1 without involvement of a cable, satellite or multiple-system operator, a security camera, a monitoring camera, etc.), where a brand and/or a model of the second electronic device are initially unknown to the electronic device. Note that receiving the image may involve wired or wireless communication with the second electronic device. Moreover, the image may include a logo or a graphical icon associated with the second electronic device. For example, the image may be included before or during a data stream of content that is received from the second electronic device. In some embodiments, the image may be included in a set of predefined images associated with different brands and/or different models of electronic devices, e.g., the image may be one of a finite number of possible different brands and/or different models.

Then, the electronic device may perform image analysis on the image (operation 912) to determine at least the brand of the second electronic device. In some embodiments, the image analysis is performed by the electronic device, such as by using a predetermined (or pretrained) classifier (e.g., based on a machine-learning technique, such as support vector machine, LASSO, linear or nonlinear regression, classification and regression trees, etc.) and/or a neural network (such as a convolutional neural network). Alternatively or additionally, the image analysis may be performed by a computer (such as computer 130 in FIG. 1, which, e.g., may be accessed via network 128 by A/V hub 112 and/or A/V display device 114-1) that is remotely located from the electronic device (such as a cloud-based computer). For example, performing the image analysis may involve the electronic device providing the image to the computer, and subsequently receiving second information from the computer that specifies at least the brand of the second electronic device.

Moreover, the electronic device accesses, based at least in part on the determined brand, the set of remote-control commands (operation 914) that are associated with the second electronic device, and may store the set of remote-control commands (operation 916) in memory in or associated with the electronic device. For example, the electronic device may provide a request to a second computer (such as computer 132 in FIG. 1, which, e.g., may be accessed via network 128 by A/V hub 112 and/or A/V display device 114-1) at a remote location (which may be the same as or different from the computer that may perform the image analysis) with at least the determined brand and/or a type of the second electronic device (such as a video player, etc.). In response, the electronic device may receive the set of remote-control commands, e.g., from the second computer at the remote location. Note that the set of remote-control commands may include commands associated with infrared communication. In some embodiments, the image analysis (operation 912) may determine the model of the second electronic device, and accessing the set of remote-control commands (operation 914) may be based at least in part on the determined model.

Subsequently, when the electronic device receives user-interface activity information (operation 918) from a portable electronic device (such as a remote control or a cellular telephone) that specifies selection of the second electronic device (e.g., via a user interface), the electronic device may provide the set of remote-control commands (operation 920) to the second electronic device. Note that providing the set of remote-control commands may involve wireless communication with the portable electronic device.

In some embodiments, the electronic device optionally performs one or more additional operations (operation 922). For example, when the model of the second electronic device remains unknown after the image analysis, accessing the set of remote-control commands (operation 914) may involve accessing multiple sets of remote-control commands that are potentially associated with the second electronic device and that include the set of remote-control commands. For example, the multiple sets of remote-control commands may be associated with the determined brand. Alternatively or additionally, the multiple sets of remote-control commands may be associated with a type of the second electronic device. Then, the electronic device may provide, to the portable electronic device, at least a remote-control command in a given set of remote-control commands that is associated with a given model, along with an instruction for the portable electronic device to output at least the remote-control command to the second electronic device. Alternatively, instead of the electronic device providing at least the remote-control command intended for the portable electronic device, the electronic device may provide a command corresponding to at least the remote-control command in a given set of remote-control commands to the second electronic device. Next, the electronic device may monitor whether the second electronic device responds to at least the remote-control command or the command. For example, the electronic device may monitor an interface connected or coupled to the second electronic device to detect a change in activity and, more generally, may determine a change in state of the second electronic device.

The providing and monitoring operations may be repeated with different remote-control commands or different commands corresponding to different remote-control commands in the multiple sets of remote-control commands that are intended for the second electronic device until a response of the second electronic device is detected (such as information that indicates the change in the state, receiving of audio or video content, or, more generally, a data stream associated with the second electronic device, etc.). Based at least in part on the detected response, the electronic device may identify the model of the second electronic device. Note that the identification of the model may be automatically performed by the electronic device without further human action or may request user confirmation or approval of the identified model. Using the brand and/or the model, the electronic device may then access the set of remote-control commands (operation 914).

In these ways, method 900 may allow the electronic device and/or the portable electronic device to operate the second electronic device (such as to control the second electronic device in response to user selected commands in a user interface displayed on or provided by the portable electronic device) even when the second electronic device does not have the ability to directly provide information that specifies its brand and/or model. Consequently, method 900 may eliminate the need for a user of the second electronic device to manually provide or program the set of remote-control commands, or to use the portable electronic device to attempt to identify the set of remote-control commands by iteratively having the portable electronic device provide different remote-control commands until a response of the second electronic device is received or detected. Thus, method 900 may reduce user frustration and may improve the user experience when using the electronic device, the portable electronic device and/or the second electronic device.

In some embodiments of method 900 there are additional or fewer operations. Moreover, the order of the operations may be changed, and/or two or more operations may be combined into a single operation. Furthermore, one or more operations may be modified.

For example, instead of having the identified set of remote-control commands provided to and stored by the electronic device, in some embodiments the second computer may associate the set of remote-control commands with the portable electronic device based at least in part on the determined brand and/or model (and, more generally, based at least in part on information received from the electronic device), and subsequently, in response to the user-interface activity information, the portable electronic device may request and then receive the set of remote-control commands from the second computer.

While the preceding embodiments were illustrated using image analysis to determine the brand and/or model of the second electronic device, in other embodiments content provided by the second electronic device may be analyzed using one or more additional techniques to determine the brand and/or the model. For example, sound or audio content may be analyzed by the electronic device and/or the computer.

Figure 10:
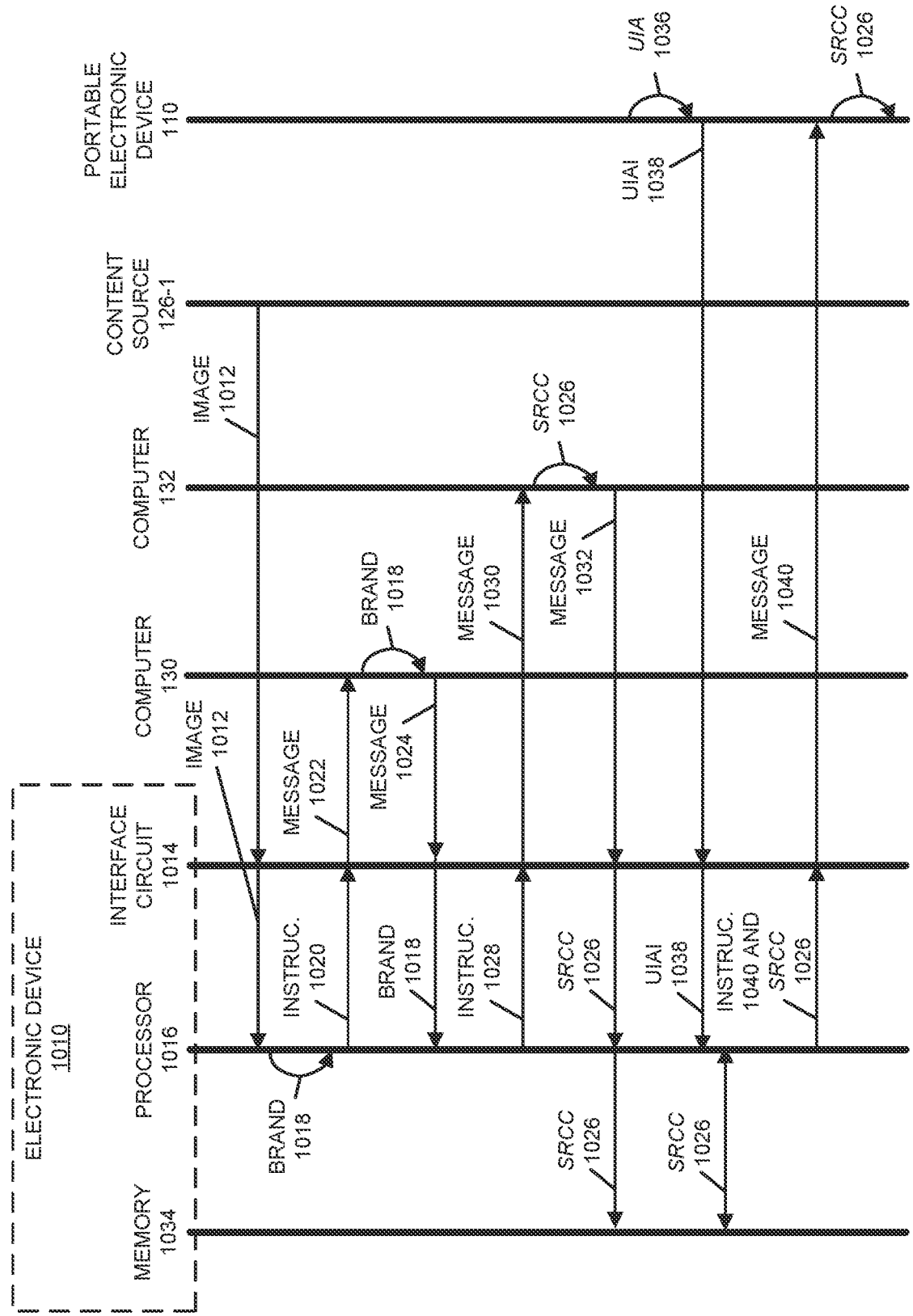
FIG. 10 is a drawing illustrating communication among the electronic devices in FIG. 1 in accordance with an embodiment of the present disclosure.

FIG. 10 presents a drawing illustrating communication among portable electronic device 110, electronic device 1010 (such as A/V hub 112 or A/V display device 114-1), content source 126-1 (which is used as an illustration of the second electronic device), computer 130 and computer 132.

When content source 126-1 is coupled or connected to electronic device 1010 and turned or powered on, content source 126-1 may provide an image 1012 to electronic device 1010. For example, image 1012 may include a logo or a graphical icon associated with content source 126-1, such as a logo of a manufacturer of content source 126-1 or a service provider that uses content source 126-1. Note that initially a brand and/or model of content source 126-1 may be unknown to electronic device 1010.

Interface circuit 1014 in electronic device 1010 may receive image 1012, and may provide image 1012 to processor 1016 in electronic device 1010. In response, processor 1016 may locally perform image analysis on image 1012 to determine at least a brand 1018 of content source 126-1. Alternatively or additionally, performing the image analysis may involve: processor 1016 providing an instruction 1020 to interface circuit 1014 to provide a message 1022 (such as one or more packets or frames) to computer 130 with mage 1012. After receiving image 1012, computer 130 may perform at least a portion of the image analysis to determine at least brand 1018, and may provide a message 1024 (such as one or more additional packets or frames) with at least brand 1018 to electronic device 1010. Moreover, after receiving message 1024, interface circuit 1014 may provide brand 1018 to processor 1016.

Based at least in part on brand 1018, processor 1016 may access a set of remote-control commands (SRCC) 1026 for content source 126-1. For example, processor 1016 may access the set of remote-control commands 1026 by providing an instruction 1028 to interface circuit 1014 to provide a message 1030 (such as one or more packets or frames) to computer 132 (such as a computer that stores sets of remote-control commands or information that specifies remote-control comments for different electronic devices, such as for electronic devices for one or more brands and/or one or more models) with a request for the set of remote-control commands 1026. After receiving this request, computer 132 may provide a message 1032 (such as one or more additional packets or frames) with the set of remote-control commands 1026 to electronic device 1010. Moreover, after receiving message 1032, interface circuit 1014 may provide the set of remote-control commands 1026 to processor 1016, which may store the set of remote-control commands 1026 in memory 1034 in electronic device 1010. Alternatively, in some embodiments, the set of remote-control commands

1026 may be stored in memory that is associated with electronic device 1010, but which is not included in electronic device 1010.

Subsequently, a user of portable electronic device 110 may interact with a user interface that is provided by or display on portable electronic device 110. For example, the user may activate or click on a virtual icon in a user interface displayed on a touch-sensitive display or may provide a verbal command via a voice interface associated with portable electronic device 110. This user-interface activity (UIA) 1036 may specify selection of content source 126-1 by the user. Next, portable electronic device 110 may provide user-interface activity information (UIAI) 1038 that specifies this selection to electronic device 1010.

After receiving user-interface activity information 1038, interface circuit 1014 may provide user-interface activity information 1038 to processor 1016. In response to the selection, processor 1016 may access the set of remote-control commands 1026 (such as in memory 10134), and may provide the set of remote-control commands 1026 and an instruction 1040 to interface circuit 1014. Then, in response to instruction 1040, interface circuit 1014 may provide a message 1042 with the set of remote-control commands 1026 to portable electronic device 110.

While FIGS. 4 and 5 are illustrated with single or dual-sided arrows that, respectively indicate unidirectional or bidirectional communication, in general any of the operations in FIGS. 4 and 5 may be unidirectional or bidirectional.

In some embodiments, the second electronic device provides an image (such as a logo of a manufacturer of the second electronic device or a suite of one or more products from the manufacturer) to the electronic device. Using method 900 (FIG. 9), the electronic device can identify the brand, model and/or type of the second electronic device based at least in part on the image. Using this information, the electronic device can access an appropriate set of remote-control commands for a portable electronic device (such as a remote control) to use in order to control the second electronic device. For example, the set of remote-control commands may include remote-control commands for a DVD player, such as: turn on, play, stop, fast forward slow, fast forward fast, reverse slow, reverse fast, skip, turn off, etc. Moreover, these operations may occur without user input or effort (e.g., they may occur automatically).

When the second electronic device is selected by the user of the portable electronic device, the electronic device may provide the set of remote-control commands to the portable electronic device (such as using Wi-Fi, Bluetooth or infrared communication). The portable electronic device may modify a user interface (such as one or more virtual icons displayed on a touch-sensitive display) based at least in part on the set of remote-control commands. Then, a user can use the portable electronic device to control the second electronic device by dynamically activating different virtual icons, which may cause the portable electronic device to provide corresponding remote-control commands (such as using infrared communication) to the second electronic device.

We now describe embodiments of an electronic device. FIG. 11 presents a block diagram illustrating an electronic device 1100, such as portable electronic device 110, A/V hub 112, A/V display device 114-1 or one of speakers 116 in FIG. 1. This electronic device includes processing subsystem 1110, memory subsystem 1112, networking subsystem 1114 and optional feedback subsystem 1134. Processing subsystem 1110 includes one or more devices configured to perform computational operations. For example, processing subsystem 1110 can include one or more microprocessors, application-specific integrated circuits (ASICs), microcontrollers, programmable-logic devices, graphics processing units (GPUs) and/or one or more digital signal processors (DSPs). One or more of these components in processing subsystem are sometimes referred to as a 'control mechanism' or a 'control circuit.'

Memory subsystem 1112 includes one or more devices for storing data and/or instructions for processing subsystem 1110 and networking subsystem 1114. For example, memory subsystem 1112 can include dynamic random access memory (DRAM), static random access memory (SRAM), and/or other types of memory. In some embodiments, instructions for processing subsystem 1110 in memory subsystem 1112 include: one or more program modules or sets of instructions (such as program instructions 1122 or operating system 1124), which may be executed by processing subsystem 1110. Note that the one or more computer programs or program instructions may constitute a computer-program mechanism. Moreover, instructions in the various modules in memory subsystem 1112 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1110.

In addition, memory subsystem 1112 can include mechanisms for controlling access to the memory. In some embodiments, memory subsystem 1112 includes a memory hierarchy that comprises one or more caches coupled to a memory in electronic device 1100. In some of these embodiments, one or more of the caches is located in processing subsystem 1110.

In some embodiments, memory subsystem 1112 is coupled to one or more high-capacity mass-storage devices (not shown). For example, memory subsystem 1112 can be coupled to a magnetic or optical drive, a solid-state drive, or another type of mass-storage device. In these embodiments, memory subsystem 1112 can be used by electronic device 1100 as fast-access storage for often-used data, while the mass-storage device is used to store less frequently used data.

Networking subsystem 1114 includes one or more devices configured to couple to and communicate on a wired and/or wireless network (i.e., to perform network operations), including: control logic 1116, interface circuits 1118 and associated antennas 1120. (While FIG. 11 includes antennas 1120, in some embodiments electronic device 1100 includes one or more nodes, such as nodes 1108, e.g., pads, which can be coupled to antennas 1120. Thus, electronic device 1100 may or may not include antennas 1120.) For example, networking subsystem 1114 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system. Note that the combination of a given one of interface circuits 1118 and at least one of antennas 1120 may constitute a radio. In some embodiments, networking subsystem 1114 includes a wired interface, such as HDMI interface 1130 (which may include a state-detection circuit) and/or an interface node that can be connected or coupled to one or more other electronic devices via a wired interface.

Networking subsystem 1114 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 1100 may use the mechanisms in networking subsystem 1114 for performing simple wireless communication between the electronic devices, e.g., transmitting advertising or beacon frames and/or scanning for advertising frames transmitted by other electronic devices as described previously.

Within electronic device 1100, processing subsystem 1110, memory subsystem 1112, networking subsystem 1114 and optional feedback subsystem 1134 are coupled together using bus 1128. Bus 1128 may include an electrical, optical, and/or electro-optical connection that the subsystems can use to communicate commands and data among one another. Although only one bus 1128 is shown for clarity, different embodiments can include a different number or configuration of electrical, optical, and/or electro-optical connections among the subsystems.

In some embodiments, electronic device 1100 includes a display subsystem 1126 for displaying information on a display (such as the communication warning message), which may include a display driver, an I/O controller and the display. Note that a wide variety of display types may be used in display subsystem 1126, including: a two-dimensional display, a three-dimensional display (such as a holographic display or a volumetric display), a head-mounted display, a retinal-image projector, a heads-up display, a cathode ray tube, a liquid-crystal display, a projection display, an electroluminescent display, a display based on electronic paper, a thin-film transistor display, a high-performance addressing display, an organic light-emitting diode display, a surface-conduction electronic-emitter display, a laser display, a carbon-nanotube display, a quantum-dot display, an interferometric modulator display, a multi-touch touchscreen (which is sometimes referred to as a touch-sensitive display), and/or a display based on another type of display technology or physical phenomenon.

Furthermore, optional feedback subsystem 1134 may include one or more sensor-feedback mechanisms or devices, such as: a vibration mechanism or a vibration actuator (e.g., an eccentric-rotating-mass actuator or a linear-resonant actuator), a light, one or more speakers, etc., which can be used to provide feedback to a user of electronic device 1100 (such as sensory feedback about the status of a user instruction to change the state of one of the components in system 100 in FIG. 1).

Electronic device 1100 can be (or can be included in) any electronic device with at least one network interface. For example, electronic device 1100 can be (or can be included in): a desktop computer, a laptop computer, a subnotebook/netbook, a server, a tablet computer, a smartphone, a cellular telephone, a consumer-electronic device (such as a television, a set-top box, audio equipment, video equipment, etc.), a remote control, a portable computing device, an access point, a router, a switch, communication equipment, test equipment, and/or another electronic device.

Although specific components are used to describe electronic device 1100, in alternative embodiments, different components and/or subsystems may be present in electronic device 1100. For example, electronic device 1100 may include one or more additional processing subsystems, memory subsystems, networking subsystems, and/or display subsystems. Moreover, while one of antennas 1120 is shown coupled to a given one of interface circuits 1118, there may be multiple antennas coupled to the given one of interface circuits 1118. For example, an instance of a 3×3 radio may include three antennas. Additionally, one or more of the subsystems may not be present in electronic device 1100. Furthermore, in some embodiments, electronic device 1100 may include one or more additional subsystems that are not shown in FIG. 11. Also, although separate subsystems are shown in FIG. 11, in some embodiments, some or all of a given subsystem or component can be integrated into one or more of the other subsystems or component(s) in electronic device 1100. For example, in some embodiments program instructions 1122 is included in operating system 1124.

Moreover, the circuits and components in electronic device 1100 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 1114, such as one or more radios. Moreover, the integrated circuit may include hardware and/or software mechanisms that are used for transmitting wireless signals from electronic device 1100 and receiving signals at electronic device 1100 from other electronic devices. Aside from the mechanisms herein described, radios are generally known in the art and hence are not described in detail. In general, networking subsystem 1114 and/or the integrated circuit can include any number of radios.

In some embodiments, networking subsystem 1114 and/or the integrated circuit include a configuration mechanism (such as one or more hardware and/or software mechanisms) that configures the radios to transmit and/or receive on a given channel (e.g., a given carrier frequency). For example, in some embodiments, the configuration mechanism can be used to switch the radio from monitoring and/or transmitting on a given channel to monitoring and/or transmitting on a different channel. (Note that 'monitoring' as used herein comprises receiving signals from other electronic devices and possibly performing one or more processing operations on the received signals, e.g., determining if the received signal comprises an advertising frame, calculating a performance metric, performing spectral analysis, etc.) Furthermore, networking subsystem 1114 may include at least one port (such as an HDMI port 1132) to receive and/or provide the information in the data stream to A/V display device 114-1 (FIG. 1) and/or one of the one or more content sources 116 (FIG. 1).

While a communication protocol compatible with Wi-Fi was used as an illustrative example, the described embodiments may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the content-analysis technique may be implemented using program instructions 1122, operating system 1124 (such as drivers for interface circuits 1118) and/or in firmware in interface circuits 1118. Alternatively or additionally, at least some of the operations in the content-analysis technique may be implemented in a physical layer, such as hardware in interface circuits 1118.

Moreover, while the preceding embodiments included a touch-sensitive display in the portable electronic device that the user touches (e.g., with a finger or digit, or a stylus), in other embodiments the user interface is display on a display in the portable electronic device and the user interacts with the user interface without making contact or touching the surface of the display. For example, the user's interact(s) with the user interface may be determined using time-of-flight measurements, motion sensing (such as a Doppler measurement) or another non-contact measurement that allows the position, direction of motion and/or speed of the user's finger or digit (or a stylus) relative to position(s) of one or more virtual command icons to be determined. In these embodiments, note that the user may activate a given virtual command icon by performing a gesture (such as 'tapping' their finger in the air without making contact with the surface of the display). In some embodiments, the user navigates through the user interface and/or activates/deactivates functions of one of the components in system 100 (FIG. 1) using spoken commands or instructions (i.e., via voice recognition) and/or based on where they are looking in the visual feedback displayed on A/V display device 114-1 in FIG. 1 (e.g., by tracking the user's gaze or where the user is looking).

Furthermore, while A/V hub 112 (FIG. 1) was illustrated as a separate component from A/V display device 114-1 (FIG. 1), in some embodiments the components are combined into a single component or a single electronic device.

While the preceding embodiments illustrated the content-analysis technique with audio and video content (such as HDMI content), in other embodiments the content-analysis technique is used in the context of an arbitrary type of data or information. For example, the content-analysis technique may be used with home-automation data. In these embodiments, A/V hub 112 (FIG. 1) may facilitate communication among and control of a wide variety of electronic devices, including electronic devices in addition to or other than electronic devices, monitoring devices or security devices. Thus, A/V hub 112 (FIG. 1) and the content-analysis technique may be used to facilitate or implement services in the so-called Internet of things.

In the preceding description, we refer to 'some embodiments.' Note that 'some embodiments' describes a subset of all of the possible embodiments, but does not always specify the same subset of embodiments.

Moreover, note that the numerical values provided are intended as illustrations of the content-analysis technique. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device configured to communicate with:
   a portable electronic device comprising a wireless communication device; and
   a second electronic device,
   wherein the electronic device and the second electronic device do not comprise a remote control, and the electronic device is configured to:
      receive an image associated with the second electronic device, wherein a brand and a model of the second electronic device are initially unknown to the electronic device;
      perform image analysis on the image to determine at least the brand of the second electronic device;
      access, based at least in part on the determined brand, a set of remote-control commands that are associated with the second electronic device;
      store the set of remote-control commands in memory;
      receive user-interface activity information from the portable electronic device that specifies selection of the second electronic device; and
      selectively provide to the portable electronic device one or more commands of the set of remote-control commands intended for the second electronic device in response to the user-interface activity information.

2. The electronic device of claim 1, wherein receiving the image comprises wired or wireless communication, while providing the set of remote-control commands comprises wireless communication.

3. The electronic device of claim 1, wherein the set of remote-control commands comprises commands associated with infrared communication.

4. The electronic device of claim 1, wherein performing the image analysis comprises:
   providing the image intended for a computer; and
   receiving second information associated with the computer that specifies at least the brand of the second electronic device.

5. The electronic device of claim 1, wherein the image analysis determines the model of the second electronic device, and accessing the set of remote-control commands is based at least in part on the determined model.

6. The electronic device of claim 1, wherein accessing the set of remote-control commands comprises receiving the set of remote-control commands associated with a computer.

7. The electronic device of claim 1, wherein, when the model of the second electronic device remains unknown after the image analysis, accessing the set of remote-control commands comprises:
   accessing multiple sets of remote-control commands that are potentially associated with the second electronic device and that comprise the set of remote-control commands, wherein the sets of remote-control commands are accessed based at least in part on the determined brand, a type of the second electronic device or both; and
   providing, intended for the portable electronic device, at least a remote-control command in a given set of remote-control commands that is associated with a given model, along with an instruction for the portable electronic device to output at least the remote-control command to the second electronic device;
   monitoring whether the second electronic device responds to at least the remote-control command;

repeat the providing and monitoring operations with different remote-control commands in the sets of remote-control commands until a response of the second electronic device is detected; and identifying the model of the second electronic device based at least in part on the detected response.

8. The electronic device of claim 7, wherein the monitoring comprises monitoring an interface between the electronic device and the second electronic device for a change in activity of the second electronic device or a change in state of the electronic device.

9. The electronic device of claim 1, wherein, when the model of the second electronic device remains unknown after the image analysis, accessing the set of remote-control commands comprises:

accessing multiple sets of remote-control commands that are potentially associated with the second electronic device and that comprise the set of remote-control commands, wherein the sets of remote-control commands are accessed based at least in part on the determined brand, a type of the second electronic device or both; and providing, intended for the second electronic device, at least a command corresponding to at least a remote-control command in the given set of remote-control commands that is associated with a given model;

monitoring whether the second electronic device responds to at least the command;

repeating the providing and monitoring operations with different commands corresponding to different remote-control commands in the sets of remote-control commands until a response of the second electronic device is detected; and identifying the model of the second electronic device based at least in part on the detected response.

10. The electronic device of claim 9, wherein the monitoring comprises monitoring an interface between the electronic device and the second electronic device for a change in activity of the second electronic device or a change in state of the electronic device.

11. The electronic device of claim 1, wherein the image comprises a logo or a graphical icon associated with the second electronic device.

12. The electronic device of claim 1, wherein the image comprises a set of predefined images associated with different brands and different models of electronic devices.

13. The electronic device of claim 1, wherein selectively providing to the portable electronic device one or more commands of the set of remote-control commands further comprises providing the portable electronic device a subset of the remote-control commands that does not include the entire set of remote-control commands.

14. The electronic device of claim 1, wherein the wireless communication device is selected from the group consisting of a tablet computer, a smartphone, and a cellular telephone.

15. A non-transitory computer-readable storage medium for use with an electronic device, the computer-readable storage medium storing program instructions that, when executed by the electronic device, causes the electronic device to perform operations comprising:

receiving an image associated with a second electronic device, wherein a brand and a model of the second electronic device are initially unknown to the electronic device;

performing image analysis on the image to determine at least the brand of the second electronic device;

accessing, based at least in part on the determined brand, a set of remote-control commands that are associated with the second electronic device;

storing the set of remote-control commands in memory;

receiving user-interface activity information from a portable electronic device that specifies selection of the second electronic device, wherein the portable electronic device comprises a wireless communication device and the electronic device and the second electronic device do not comprise a remote control; and selectively providing, to the portable electronic device, one or more commands of the set of remote-control commands intended for the second electronic device in response to the user-interface activity information.

16. The non-transitory computer-readable storage medium of claim 15, wherein the set of remote-control commands comprises commands associated with infrared communication.

17. The non-transitory computer-readable storage medium of claim 15, wherein performing the image analysis comprises:

providing the image intended for a computer; and receiving second information associated with the computer that specifies at least the brand of the second electronic device.

18. The non-transitory computer-readable storage medium of claim 15, wherein accessing the set of remote-control commands comprises receiving the set of remote-control commands associated with a computer.

19. The non-transitory computer-readable storage medium of claim 15, wherein, when the model of the second electronic device remains unknown after the image analysis, accessing the set of remote-control commands comprises:

accessing multiple sets of remote-control commands that are potentially associated with the second electronic device and that comprise the set of remote-control commands, wherein the sets of remote-control commands are accessed based at least in part on the determined brand, a type of the second electronic device or both; and providing at least a remote-control command in a given set of remote-control commands that is intended for the portable electronic device and that is associated with a given model, along with an instruction for the portable electronic device to output at least the remote-control command to the second electronic device;

monitoring whether the second electronic device responds to at least the remote-control command;

repeating the providing and monitoring operations with different remote-control commands in the sets of remote-control commands until a response of the second electronic device is detected; and identifying the model of the second electronic device based at least in part on the detected response.

20. The non-transitory computer-readable storage medium of claim 15, wherein, when the model of the second electronic device remains unknown after the image analysis, accessing the set of remote-control commands comprises:

accessing multiple sets of remote-control commands that are potentially associated with the second electronic device and that comprise the set of remote-control commands, wherein the sets of remote-control commands are accessed based at least in part on the determined brand, a type of the second electronic device or both; and providing at least a command corresponding to at least a remote-control command in the given set of remote-control commands that is intended for the second electronic device and that is associated with a given model;

monitoring whether the second electronic device responds to at least the command;

repeating the providing and monitoring operations with different commands corresponding to different remote-control commands in the sets of remote-control commands until a response of the second electronic device is detected; and identifying the model of the second electronic device based at least in part on the detected response.

21. The non-transitory computer-readable storage medium of claim 15, wherein the wireless communication device is selected from the group consisting of a tablet computer, a smartphone, and a cellular telephone.

\* \* \* \* \*